(12) United States Patent
Sarresh et al.

(10) Patent No.: US 7,043,273 B2
(45) Date of Patent: May 9, 2006

(54) DIVERSITY BRANCH DELAY ALIGNMENT IN RADIO BASE STATION

(75) Inventors: Lawrence Sarresh, Kista (SE); Ning He, Sollentuna (SE); Thomas Leif Östman, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 543 days.

(21) Appl. No.: 10/045,024

(22) Filed: Jan. 15, 2002

(65) Prior Publication Data

US 2003/0171139 A1   Sep. 11, 2003

(51) Int. Cl.
*H04Q 7/20*   (2006.01)

(52) U.S. Cl. .............................. 455/562.1; 455/226.1; 455/561; 455/101

(58) Field of Classification Search ................ 455/561, 455/562.1, 445, 454, 10, 13.3, 13.4, 17, 18, 455/501, 504, 506, 526, 63.1, 65, 67.11, 277.1, 455/279.1, 132, 423, 101; 370/203–213, 370/320, 334; 375/147, 148, 260, 267
See application file for complete search history.

(56) References Cited

U.S. PATENT DOCUMENTS

| 5,613,219 | A | * | 3/1997 | Vogel et al. ................... 455/78 |
| 6,327,299 | B1 | | 12/2001 | Meszko |
| 6,625,202 | B1 | * | 9/2003 | Sudo et al. ................... 375/147 |
| 6,700,865 | B1 | * | 3/2004 | Yamamoto et al. .......... 370/208 |
| 6,799,055 | B1 | * | 9/2004 | Heinila ........................ 455/526 |
| 2001/0024466 | A1 | | 9/2001 | Schilling | |

FOREIGN PATENT DOCUMENTS

| EP | 0 938 204 A1 | 8/1999 |
| EP | 1 069 713 A1 | 1/2001 |
| WO | 95/15665 | 6/1995 |

OTHER PUBLICATIONS

EP Search Report mailed Jul. 17, 2002.
International Search Report mailed Apr. 1, 2003 in corresponding PCT application No. PCT/SE03/00025.
International Preliminary Examination Report mailed Feb. 11, 2004 in corresponding PCT Application No. PCT/SE03/00025.

* cited by examiner

*Primary Examiner*—Jean Gelin
(74) *Attorney, Agent, or Firm*—Nixon & Vanderhye, P.C.

(57) ABSTRACT

A base station (28) included in a radio access network of a telecommunications system has two diversity antennas (44A, 44B) for a cell/carrier utilized in a sector served by the base station which are respectively involved in transmission of two branches of a radio link signal of the cell/carrier between the base station and a user equipment unit (30). Two branches of signal processing hardware respectively process the two branches of the radio link signal to yield two respective processed branches of the radio link signal. A rake receiver (62, 262) measures the delay difference between the two processed branches of the radio link signal, and uses the measured delay difference for various purposes. For example, some embodiments of the invention use the delay difference between the two branches as measured by the rake receiver to compensate for a delay difference which exists between the two processed branches of the radio link signal. When measuring the delay difference between the two branches of an uplink radio signal, a rake receiver (62) at the radio base station is employed. On the other hand, when measuring the delay difference between the two branches of a downlink radio signal, a rake receiver (262) at test user equipment unit (30T) is employed.

32 Claims, 16 Drawing Sheets

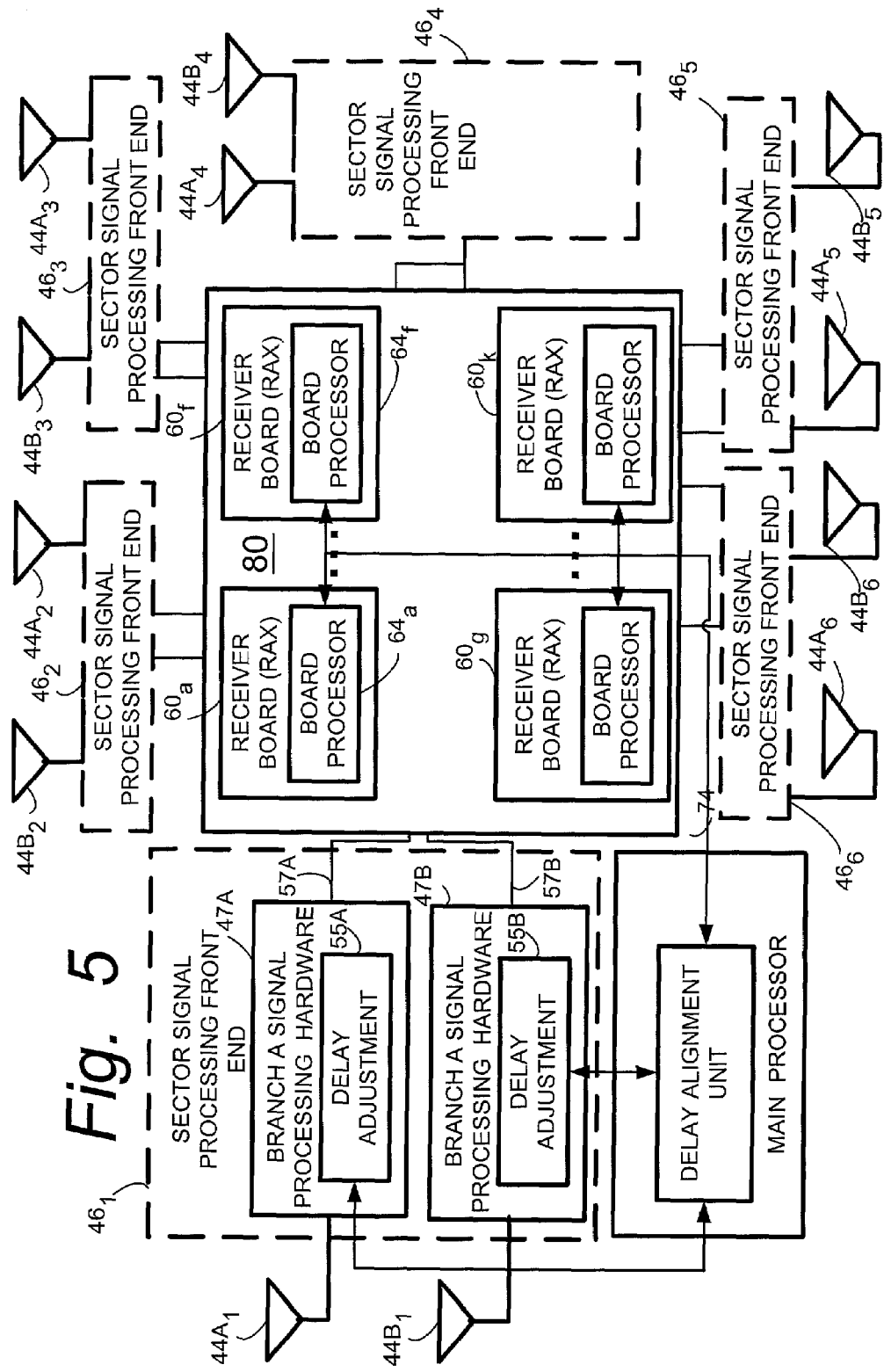

DIVERSITY BRANCH DELAY ALIGNMENT IN RADIO BASE STATION

BACKGROUND

1. Field of the Invention

The present invention pertains to wireless telecommunications, and particularly to diversity branch delay alignment in a sector of a radio base station of a radio access network of a telecommunications system.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

As those skilled in the art appreciate, in W-CDMA technology a common frequency baNd allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that Can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks). MSCs and GSNs are in contact with a Home Location Register (HRL), which is a database of subscriber information.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link as described, for example, in International Application Number PCT/US94/12419 (International Publication Number WO 95/15665). An interface between radio network controllers (e.g., between a Serving RNC [SRNC] and a Drift RNC [DRNC]) is termed the "Iur" interface.

A base station is typically located near the center of its associated cell. A base station can have plural sectors, with each sector having one or more antenna. The antenna of each sector are directed to cover a certain geographical portion of the cell. For example, a cell may comprise three or six essentially Triangular sectors, with the antenna of each sector positioned and directed to cover the area of its triangular sector. The antenna of all sectors are generally connected to hardware at a common base station site.

Having more than one antenna per sector of a cell provides for diversity branches of a link with a user equipment unit (UE) in communication with the base station. Employment of diversity antennas for a sector of a cell improves reception quality and (to some extent) eliminates the effect of fading.

Using diversity antennas at a sector provides reception gain, as more than one branch of the radio link with the user equipment unit (UE) can be established. However, having two different branches (with separate signal routes and hardware components with different delay figures (mean value and variance)) results in delay differences between the two branches and delay misalignment. Thus, employment of diversity antennas also involves branch delay differences. That is, the differing branches of the radio link may have signals with corresponding differing arrival times and differing signal processing delays, thereby making it difficult to analyze collectively the signals of the respective branches to obtain perhaps a more accurate resultant signal. These branch delay differences are caused, at least in part, by an accumulation of delay differences in different hardware components used to process each branch. Each branch of the radio link is applied at the base station to a series of hardware components for the branch. Although the series of hardware components, and functions of the hardware components, are essentially the same from one branch to another, as a practical matter the individual hardware components do have differing processing delay times.

Moreover, there are also delay difference components induced by environmental conditions, equipment aging, and direction of arrival of a signal. All these factors, individually or cumulatively, can result in substantial delay differences between branches of a radio link, which degrade or completely defeat any processing gain sought by usage of diversity antennas.

In code division multiple access systems, a precise delay alignment between the branches is necessary in order to obtain a reasonable gain when using diversity antennas. Otherwise the gain from diversity is negligible and not worth the complexity.

An attempt has previously been made to compensate for the delay differences between branches of a radio link received by diversity antennas at a sector of a base station. Typically the delay differences are calculated based on certain hardware delay mean values which are measured at the hardware factory and stored in a memory (e.g., flash memory) on a board or the like which bears the hardware. Also, delays occasioned by cabling (e.g., between hardware components) is calculated according to cable type and length. Using the stored delay differences for the hardware and the cables, some type of compensation value is calculated and employed to adjust the induced delay between the branches.

Unfortunately, the foregoing attempt to compensate for delay differences entails substantial error. Factory measurement of hardware delay may not be accurate, and in any event may differ substantially from actual delay experienced due to non-factory (e.g., installation at base station) environmental factors. Moreover, temperature and equipment aging introduce relatively serious errors in calculating a delay difference between two branches. Further, any delay difference contribution owing to differing direction of arrival of two branches is not taken into account.

In order to make beneficial use of diversity antennas for a same cell/carrier at a base station, the delay alignment precision between the two diversity branches should be on the order of about 32.55 nanosecond. The better the alignment, the greater the diversity gain. Yet the best precision that current techniques (such as that aforedescribed) can muster is around 65 nanoseconds.

What is needed, therefore, and an object of the present invention, is a technique for providing more accurate delay difference precision between differing branches of a radio link for diversity antennas of a sector of a cell.

BRIEF SUMMARY OF THE INVENTION

A base station included in a radio access network of a telecommunications system has two diversity antennas for a sector served by the base station which are respectively involved in transmission of two branches of a radio link signal between the base station and a user equipment unit. Two branches of signal processing hardware respectively process the two branches of the radio link signal to yield two respective processed branches of the radio link signal. A rake receiver measures the delay difference between the two processed branches of the radio link signal, and uses the measured delay difference for various purposes.

For example, some embodiments of the invention use the delay difference between the two branches as measured by the rake receiver to compensate for a delay difference which exists between the two processed branches of the radio link signal. When measuring the delay difference between the two branches of an uplink radio signal, a rake receiver at the radio base station is employed. On the other hand, when measuring the delay difference between the two branches of a downlink radio signal, a rake receiver at test user equipment unit is employed.

In a first embodiment of the invention, a rake receiver measures the delay difference between the two processed branches of the uplink radio link signal. The delay difference is utilized (e.g., by a processor) to determine a delay alignment adjustment value. The delay alignment adjustment value is applied to one of the two branches of signal processing hardware, for example to a delay alignment buffer included in one of the branches of signal processing hardware which has the shortest delay prior to the adjustment.

One example implementation of the first embodiment involves measuring the delay difference between the two processed branches of the radio link signals for plural calls (e.g., plural connections), and preferably for plural user equipment units. In this example implementation, plural rake receivers are utilized for a sector. The plural rake receivers (which can be configured, e.g., as an array of rake receivers) are configured so that at least some of the plural rake receivers can be utilized by plural sectors of the radio base station. The rake receivers measure delay difference values between the two processed branches of the radio link signal, measuring the delay difference values for differing ones of the plural sectors. A local memory provided for each of the plural rake receivers stores an average of plural delay difference values measured for a specified sector. A processor periodically accesses the local memory to obtain the average of the plural delay difference values for each of the plural rake receivers for the specified sector, and uses the average delay difference value from each rake receiver having a measurement for the specified sector to calculate the delay alignment adjustment value for the specified sector. In a variation of this implementation, the rake receiver is situated on a receiver board which also bears a board processor (which determines the average of the plural delay difference values for the rake receivers on the receiver board) and the local memory. The processor which periodically accesses the local memories is a main processor of the radio base station which has access to each of the receiver boards (which form a pool of receiver boards).

A second embodiment of the invention differs from the first embodiment in that the two branches of the uplink radio link signal are received by the two diversity antennas from a test user equipment unit which is situated essentially equidistantly from the two diversity antennas. The test user equipment unit is situated at a close and substantially equal distance from the two diversity antennas with a fairly good accuracy, i.e., a couple of nanoseconds. As in the first embodiment, the rake receiver in the receiver board measures the delay difference between the two processed branches in each sector (e.g., for each antenna pair) for the radio link which is established with the test user equipment unit. The measurements performed by the rake receiver are performed at a frequency defined by a service provider, and are stored in a local memory. Thereafter, as in the first embodiment, the measurements of the rake receiver are processed by a main processor, which calculates the amount of adjustment needed between the two branches. Again as in the first embodiment, the calculated delay adjustment value is then sent to the delay alignment buffer for the branch having the shortest delay prior to the adjustment.

A third embodiment of the invention also uses the test user equipment unit to determine diversity branch delay difference, and for the further purpose of estimating an angle of arrival for the signal received from other user equipment units. Having statistical metrics on the angle of arrival distribution for user equipment unit traffic generally can help a service provider optimize cell planning and achieve more efficient utilization of the radio frequency resources.

In essence, according to the third embodiment the delay skew between two diversity branches of incoming signals from the user equipment unit (UE) in the field are measured by rake receivers in the receiver board, and compared with those transmitted by a test user equipment unit (UE). As in the second embodiment, the test user equipment unit (UE) is positioned essentially equidistantly relative (preferably in front of) to the receive antennas, and the delay difference measured by the rake receiver permits measurement of a signal delay (delay$_{HW}$) attributable to the hardware in the respective hardware branches of the sector signal processing section. The sector also receives radio link signals from non-test (actual traffic) user equipment units, with the rake receiver also measuring the delay difference for the diversity branches of the processed radio link signal from the non-test user equipment units. The measured delay difference for the diversity branches of the processed radio link signal from the non-test user equipment units is considered as a total delay (delay$_{TOTAL}$). By subtracting the hardware signal delay component (delay$_{HW}$) discerned from the test user equipment unit (UE) from the total delay (delay$_{TOTAL}$) discerned with respect to the non-test user equipment units, a delay component attributable to the angle of arrival (delay$_{AOA}$) is determined. From the delay component attributable to the angle of arrival (delay$_{AOA}$), the angle of arrival itself (AOA) is determined. The third embodiment allows the service provider to obtain an estimate over the distribution angle of arrival of the incoming signals to the radio base station's receive antennas.

The fourth embodiment involves measuring downlink delay difference a sector having plural diversity transmit antennas. Like the second and third embodiments, the fourth embodiment utilizes a test user equipment unit. In similar fashion to the sector receive signal processing section, the sector transmit signal processing section processes two branches of a downlink radio link signal to be transmitted respectively by the two diversity antennas. Each branch of hardware has a delay adjustment means (such as delay adjustment buffer) and various signal processing hardware. In addition, the sector transmit signal processing section includes a closed loop downlink diversity branch delay alignment routine or unit which is used to determine a delay alignment adjustment which can be sent to the delay adjustment means for compensating any delay difference in the transmit signal processing hardware of the two branches. Upon starting, the closed loop downlink diversity branch delay alignment routine sends a start signal to the test user equipment unit (UE). Upon receiving the start signal from the closed loop downlink diversity branch delay alignment routine, the rake receiver of the test user equipment unit (UE) measures the delay difference on the PDP pairs from two diversity branches on each branch of the downlink radio signal in a specified measurement period. The test user equipment unit (UE) sends a report of the delay difference value to the closed loop downlink diversity branch delay alignment routine, which in turn calculates a delay adjustment value for the sector downlink signal processing section. The calculated delay adjustment value is then applied to an appropriate one of the delay adjustment means.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5 is a diagrammatic view showing an example implementation of a base station site in which an array of receiver boards serves plural sectors.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
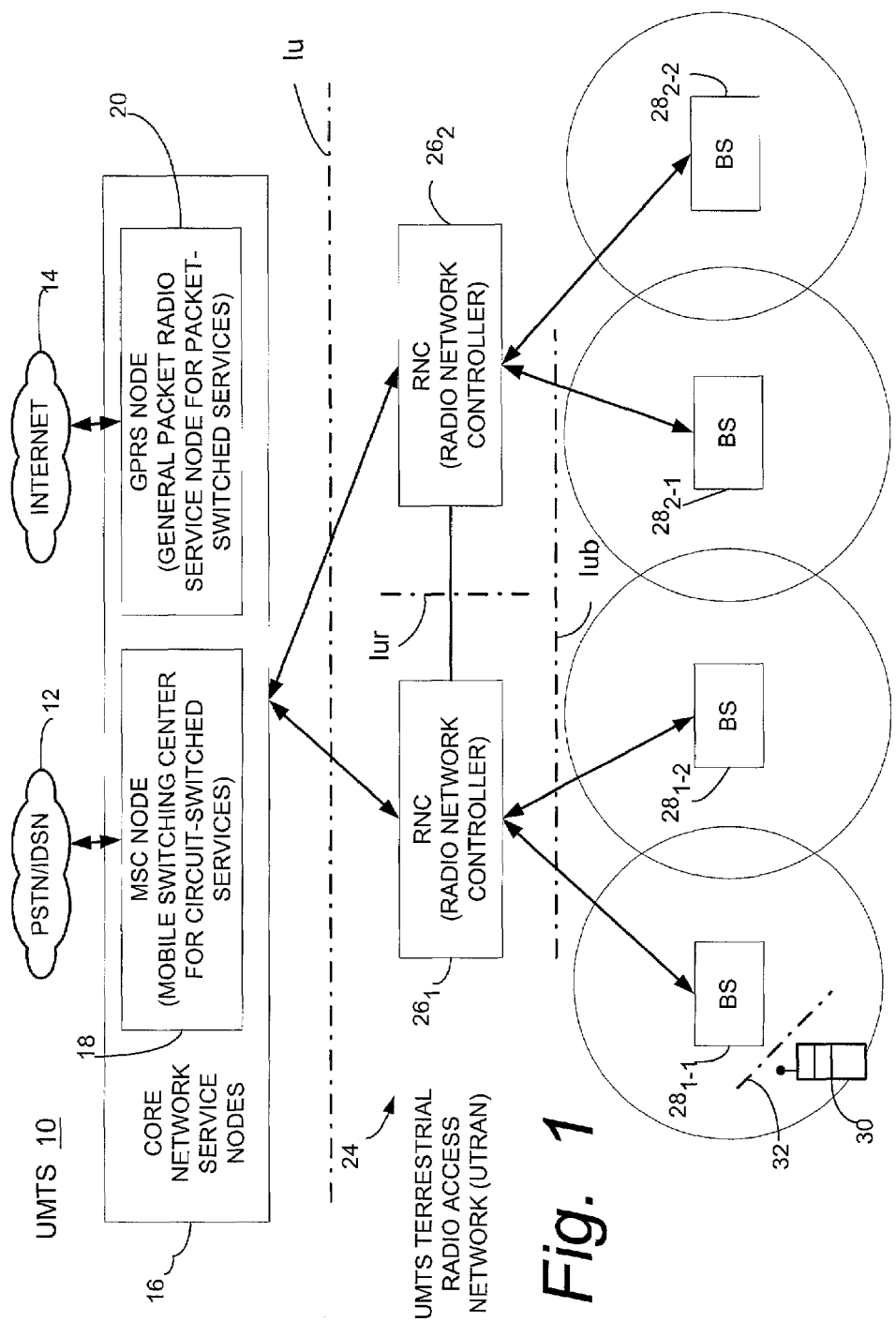
FIG. 1 is diagrammatic view of example mobile communications system in which embodiments of the present invention may be advantageously employed.

FIG. 1 shows a non-limiting, example context of a universal mobile telecommunications (UMTS) 10. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24. Further, those skilled in the art will also appreciate that a base station is sometimes also referred to in the art as a radio base station, a node B, or B-node.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site.

A user equipment unit (UE), such as user equipment unit (UE) 30 shown in FIG. 1, communicates with one or more cells or one or more base stations (BS) 28 over a radio or air interface 32. Each of the radio interface 32, the Iu interface, the Iub interface, and the Iur interface are shown by dash-dotted lines in FIG. 1.

Preferably, but not necessarily, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

Figure 2:
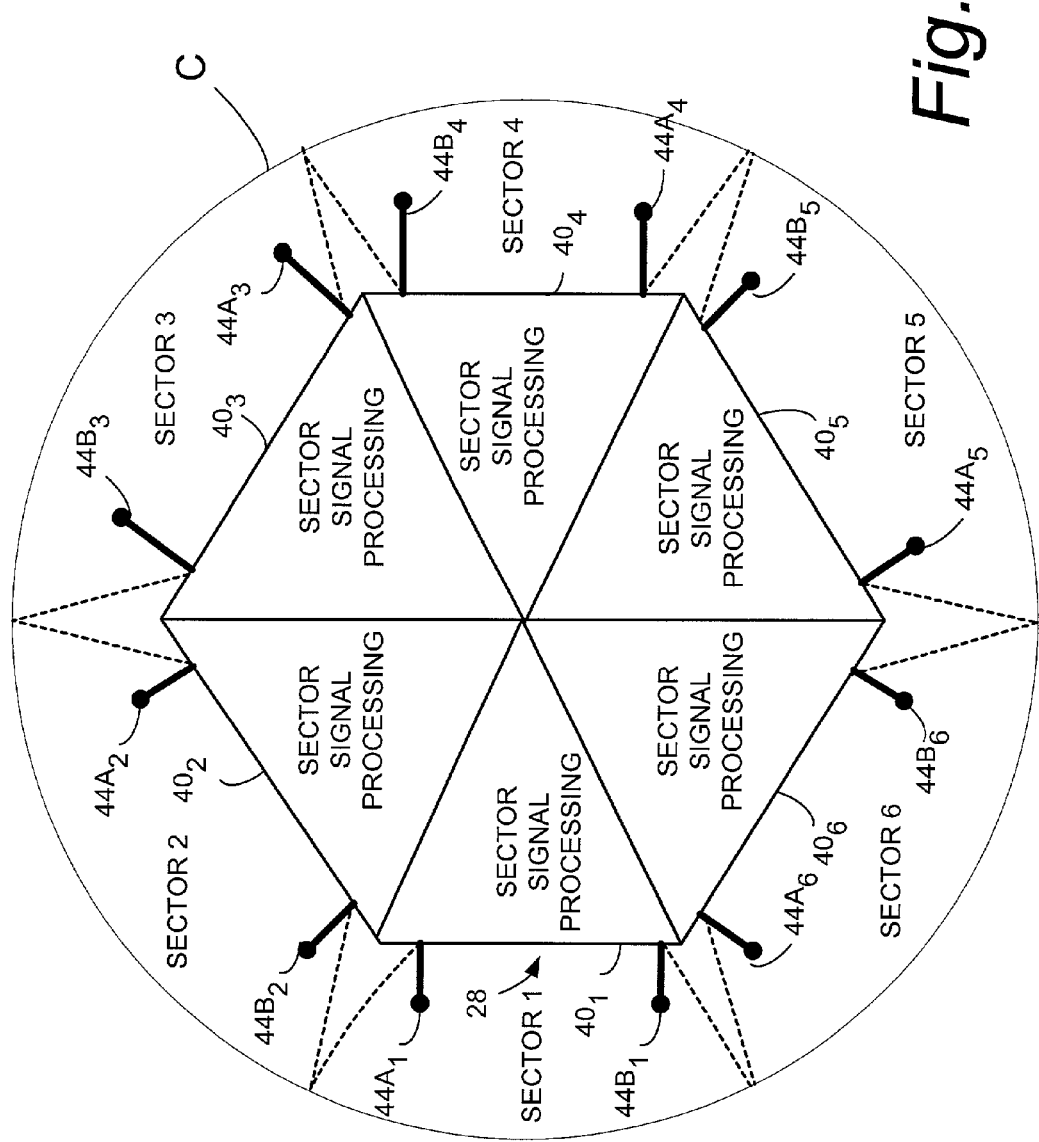
FIG. 2 is a diagrammatic view of a multi-sector base station site having diversity antennas and a sector signal processing section for each sector.

In accordance with the present invention and as rudimentarily illustrated in FIG. 2, a cell C served by a base station (generically referenced as radio base station 28) included in the radio access network 24 of telecommunications system 100 has one or more sectors, with at least one of the sectors being served with two (or more) diversity antennas. For sake of simplicity, FIG. 2 shows cell C as comprising six sectors, labeled as SECTOR 1 through SECTOR 6. Cell C may have a greater or lesser number of sectors. For each sector, the radio base station 28 includes a sector signal processing section 40, which connects to the two diversity receive antennas 44A and 44B for the sector. For example, SECTOR 1 has sector signal processing section $40_1$ which is connected to antennas $44A_1$ and $44B_1$.

It will be appreciated that FIG. 2 (and various other figures) is not to scale, as the cell C and its comprising sectors is much larger relative to the footprint of radio base station 28 than as shown. Moreover, neither the number of sectors nor the configuration (e.g., geographical extent or pattern) of the sectors is a limiting aspect of the present invention. For example, the sectors may be more geographically overlapping than as shown in FIG. 2. Nor need the shape of cell C be circular (as shown only for convenience and according to custom). The illustrative example of FIG. 2 and other figures rather depicts fundamental principles of the invention which are applicable broadly to various configurations of radio base stations.

Each sector can have one or more radio frequency carriers. As used herein, the notation "cell/carrier" denotes a particular combination of cell and radio frequency carrier for that cell.

Figure 3:
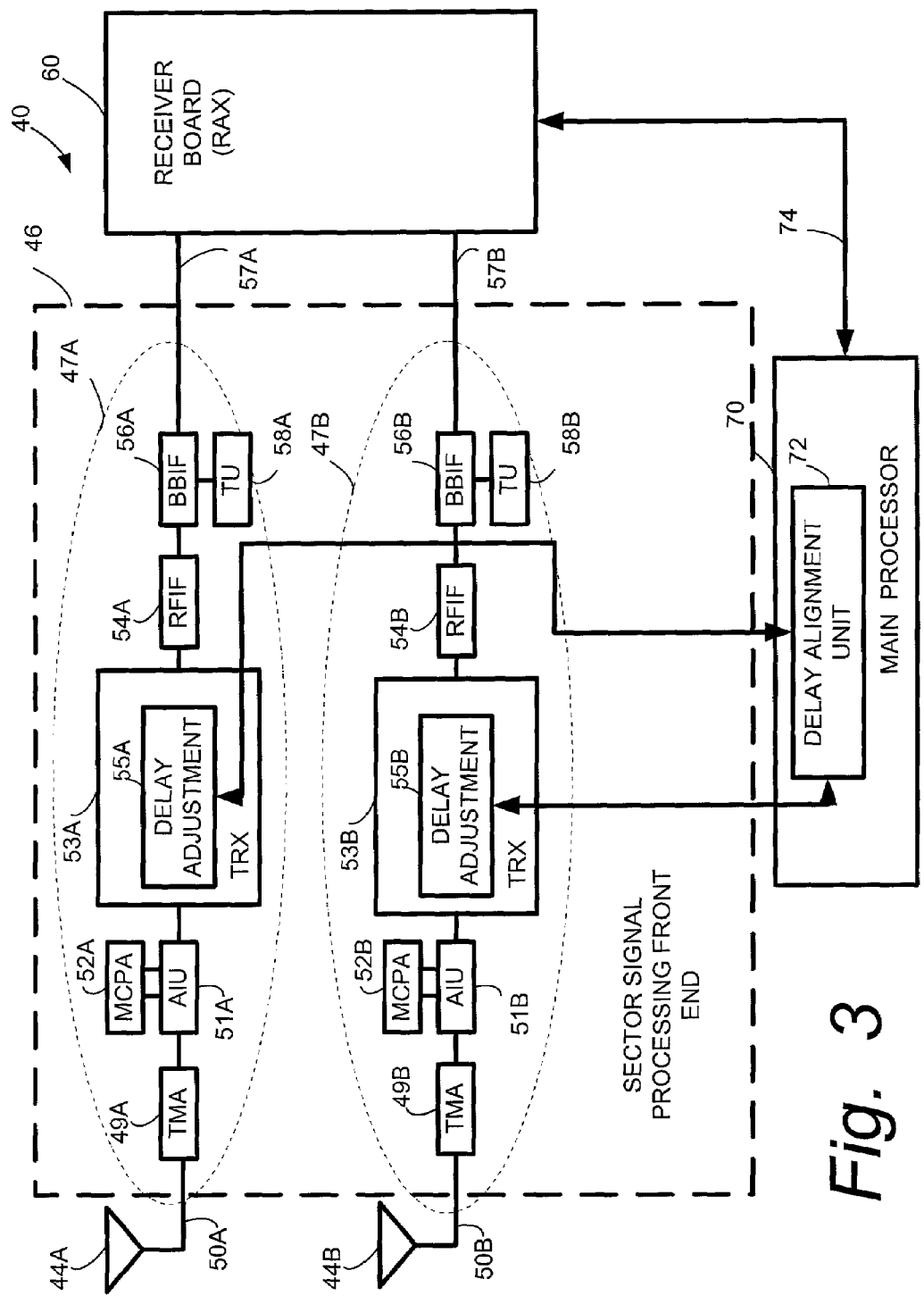
FIG. 3 is a schematic view of diversity antennas and a sector signal processing section for an example sector.

FIG. 3 shows in more detail a representative or example sector signal processing section 40 of one example sector of radio base station 28 (for which reason subscripts are not employed in FIG. 3) which handles a cell/carrier of the sector. The sector signal processing section 40 includes a sector signal processing front end 46, framed by a broken line in FIG. 3. The sector signal processing front end 46 handles two branches of a radio link signal of the cell/carrier, and accordingly has two branches of hardware. In particular, sector signal processing front end 46 has a first branch 47A of signal processing hardware ("Branch A") which handles a first branch of the radio link signal which is obtained from antenna 44A and a second branch 47B of signal processing hardware ("Branch B") which handles a second branch of the radio link signal which is obtained from antenna 44B.

Each branch 47 of signal processing hardware includes a tower mounted amplifier (TMA) 49 which is connected by a feeder 50 to its respective antenna 44. The tower mounted amplifier (TMA) 49 is connected to an input of an antenna interface unit (AI) 51, which operates in conjunction with a multi-carrier power amplifier (MCPA) 52. An output of the antenna interface unit (AI) 51 is connected to an input of a transceiver (TRX) 53, whose output is connected to an input of a radio frequency interface board (RFIF) 54. An output of the RFIF 54 is connected to a baseband interface board (BBIF) 56, which in turn is connected by line 57 to a receiver board (RAX) 60. A timing unit 58 is connected to the BBIF 56.

Each branch 47 of hardware included in sector signal processing front end 46 has a delay adjustment means (such as delay adjustment buffer 55) included in its transceiver (TRX) 53. For example, branch 47A of sector signal processing front end 46 includes delay adjustment buffer 55A situated in transceiver (TRX) 53A. Embodiments of the invention utilize the delay adjustment means for the purpose of compensating for a delay difference exists between the two processed branches of the radio link signal.

The two branches 47A, 47B of signal processing hardware respectively process the two branches of the radio link signal to yield two respective processed branches of the radio link signal, which are output from BBIF 56A and BBIF 56B as signals on lines 57A and 57B, respectively.

Figure 4:
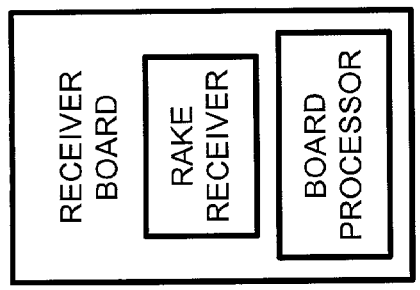
FIG. 4 is a diagrammatic view of various functionalities included in a receiver board.

Apart from sector signal processing front end 46, the sector signal processing section 40 also includes the receiver board 60, also know as a RAX board or RAX. As illustrated in FIG. 4, the receiver board 60 includes one or more rake receivers 62 and (at least in one implementation) a board processor 64. Up to as many as eight rake fingers can be utilized per radio link.

Sector signal processing section 40 includes a main processor 70. One function performed by main processor 70 which is germane to an embodiment of the present invention is delay alignment, as depicted by delay alignment function or unit 72. The main processor 70 and the board processor 64 communicate with one another as depicted by processor communication line 74.

As previously indicated, a sector can have one or more cell/carriers. For purposes of facilitating understanding of the present invention, it is sufficient to describe an example sector having just one cell/carrier. For such simple case, the sector signal processing structure of FIG. 3 can be taken as pertaining to one cell/carrier. The person skilled in the art will understand that signal processing structure such as that illustrated in FIG. 3 can be replicated for other cell/carriers for a sector having plural cell/carriers. Alternatively, some of the components shown in FIG. 3 can be utilized for plural cell/carriers.

The structure of each sector signal processing section 40 can literally be as described above with respect to FIG. 2, e.g., comprising a dedicated sector signal processing front end 46, one or more dedicated receiver boards 60, and a dedicated main processor 70. In contrast, one implementation variation is to have various non-front end elements of a sector signal processing section 40 shared or pooled for access among several (perhaps even all) cell/carriers of a radio base station, even for access for cell/carriers of differing sectors of the radio base station. For example, as one aspect of this example implementation, FIG. 5 shows an example radio base station 28 having a pool or matrix of receiver boards (RAXs) 80. As shown in FIG. 5, receiver board pool 80 comprises receiver boards 60$_a$ through 60$_k$. At least some, and perhaps all, of the receiver boards 60 in receiver board pool 80 are available to serve, at differing times, differing cell/carriers of radio base station 28, including cell/carriers of differing sectors of the radio base station. For example, receiver board 60$_a$ may at one moment in time be allocated to serve a cell/carrier of SECTOR 1, and subsequently allocated to serve a cell/carrier of SECTOR 4. Therefore, there is not necessarily any direct permanent correspondence between any receiver board 60 and any sector or cell/carrier.

As another and separable aspect of this example implementation of FIG. 5, the example radio base station 28 has a main processor 70 which serves plural sectors (e.g., preferably all sectors), and thus plural cell/carriers. The main processor 70 of FIG. 5 includes a delay alignment function or unit 72 which accordingly serves the plural cell/carriers of the plural sectors. In the FIG. 5 implementation, the processor communication line 74 comprises a bus or the like which connects main processor 70 with the board processors 64 provided on the respective receiver boards 60 in receiver board pool 80.

In the FIG. 5 implementation, receiver board pool 80 and (optionally) main processor 70 are shown as serving plural cell/carriers, and preferably cell/carriers of all sectors of cell C. To this end, FIG. 5 shows that each sector retains its own dedicated sector signal processing front end 46, with the lines 57 emanating therefrom connecting to receiver board pool 80. Although in the illustrated example embodiment all receiver boards 60 are connected to handle all cell/carriers, main processor 70 instructs each receiver board 60 individually as to which cell/carrier the receiver board is to listen and utilize. It will be appreciated that, in other embodiments, there could be other ways of applying a cell/carrier to a particular receiver board 60, e.g., a selective routing of cell/carrier to a particular receiver board 60.

In essence, in the FIG. 5 implementation, the sector signal processing front ends 46 are dedicated for each sector, while the remainder of the sector signal processing section 40 for each sector is shared or pooled (using, e.g., one or both of receiver board pool 80 and main processor 70). As indicated above, the receiver board 60 can be dedicated to a sector signal processing section 40 in the manner suggested (but not required) by FIG. 3, or situated in receiver board pool 80 as shown in the implementation of FIG. 5.

Figure 6:
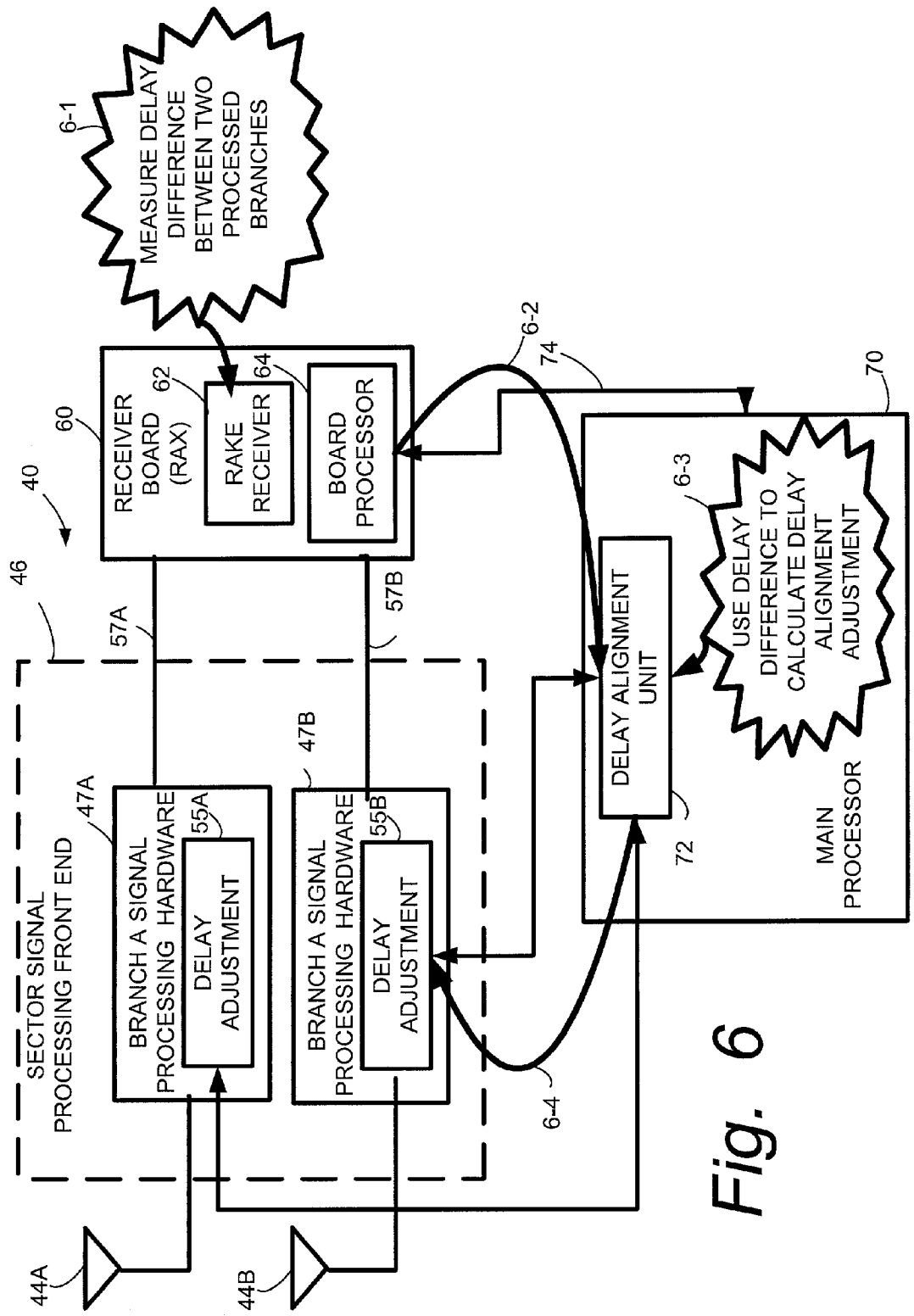
FIG. 6 is a schematic view of sector signal processing section for an example sector for illustrating basic aspects of a first embodiment of the invention.

FIG. 6 shows basic aspects of a first example embodiment. In the first embodiment, for a specified cell/carrier a rake receiver 62 allocated to the cell/carrier measures the delay difference between the two processed branches of the radio link signal, e.g., between the signals on lines 57A, 57B. Such measurement of delay difference is depicted as event 6-1 in FIG. 6. The delay difference is utilized (e.g., by a processor) to determine a delay alignment adjustment value. In the embodiment of FIG. 6, event 6-2 shows the measured delay difference (or a value derived therefrom, such as an average or weighted average delay difference) being transmitted to main processor 70. Event 6-3 shows main processor 70, and particularly delay alignment unit 72, using the delay difference to calculate a delay alignment adjustment. As event 6-4, the delay alignment adjustment value is applied to one of the two branches of signal processing hardware, for example to one of the delay alignment buffers 55A, 55B included in one of the branches 47A, 47B of signal processing hardware. In the particular situation shown in FIG. 6, the delay alignment adjustment value happens to be applied to branch 47B since it is the branch which (prior to the adjustment application) had the shortest delay, and particularly to delay adjustment buffer 55B.

How the delay adjustment value transmitted, e.g., as event 6-4, affects a delay alignment buffer 55 depends on particular configuration and implementation of the buffer. For example, delay alignment buffer 55 can be a variable delay buffer which receives a control signal, the content or value of the control signal controlling the duration of the delay caused by the buffer. As an example, if the control signal is utilized to write a value of "100" to the variable delay buffer 55, the buffer 55 will generate 100 units of delay. Each unit is Tchip/16, which is almost 16.25 nanoseconds. The delay is generated by propagating the signal through the cells of the buffer, with each propagation step being one unit.

One example mode of the first embodiment, e.g., the general embodiment of FIG. 6, can be carried out in the context of the radio base station implementation of FIG. 5. In this mode, plural rake receivers 62 (which can, for example, comprise the receiver board pool 80 with each receiver board 60 having a rake receiver 62) are configured so that at least some of the plural rake receivers can be utilized by plural cell/carriers of the radio base station. As in the case of FIG. 6, for a cell/carrier to which it is allocated (e.g., temporarily allocated), at specified intervals a given rake receiver measures the delay difference value between the two processed branches of the radio link signal for the allocated cell/carrier. In this example mode, for one or more cell/carriers the delay difference is measured with respect to the branches of radio link signals for plural calls (e.g., plural connections), preferably involving plural user equipment units.

A processor associated with the given rake receiver (such as board processor 64) computes an average of plural delay difference values measured for a specified cell/carrier. A local memory provided for each of the plural rake receivers 62, e.g., board processor 64 or a memory controlled by board processor 64, stores the calculated average of plural delay difference values measured for the allocated cell/carrier. Then, corresponding to event 6-2 in FIG. 6, a processor (such as main processor 70) periodically accesses the local memory to obtain the average of the plural delay difference values for each of the plural rake receivers for the specified cell/carrier. Further, corresponding to event 6-3, the processor (e.g., delay alignment unit 72) uses the average delay difference value from each rake receiver having a measurement for a specified cell/carrier to calculate the delay alignment adjustment value for the specified cell/carrier. The delay alignment adjustment value is then communicated to the appropriate hardware in the manner generally described as event 6-4 in FIG. 6.

To implement the example mode summarized above, certain basic actions or steps must be performed by each of rake receiver 62, board processor 64, and main processor 70. Pertinent ones of such basic actions or steps are illustrated in example form for board processor 64 and rake receiver 62 in FIG. 7A, and for main processor 70 in FIG. 7B. As used herein, "rake receiver 62" includes an uplink base band processing (UBP) rake receiver block. The UBP rake receiver block, herein generally referred to as rake receiver 62, is a set of rake fingers which are assigned by a demodulator to different phase shifts in time (delays) or power delay profiles ("PDPs"). Each PDP represents the delay/phase shift in time for each rake finger. There is one PDP for each branch and each connection/link at a given time.

Figure 7A:
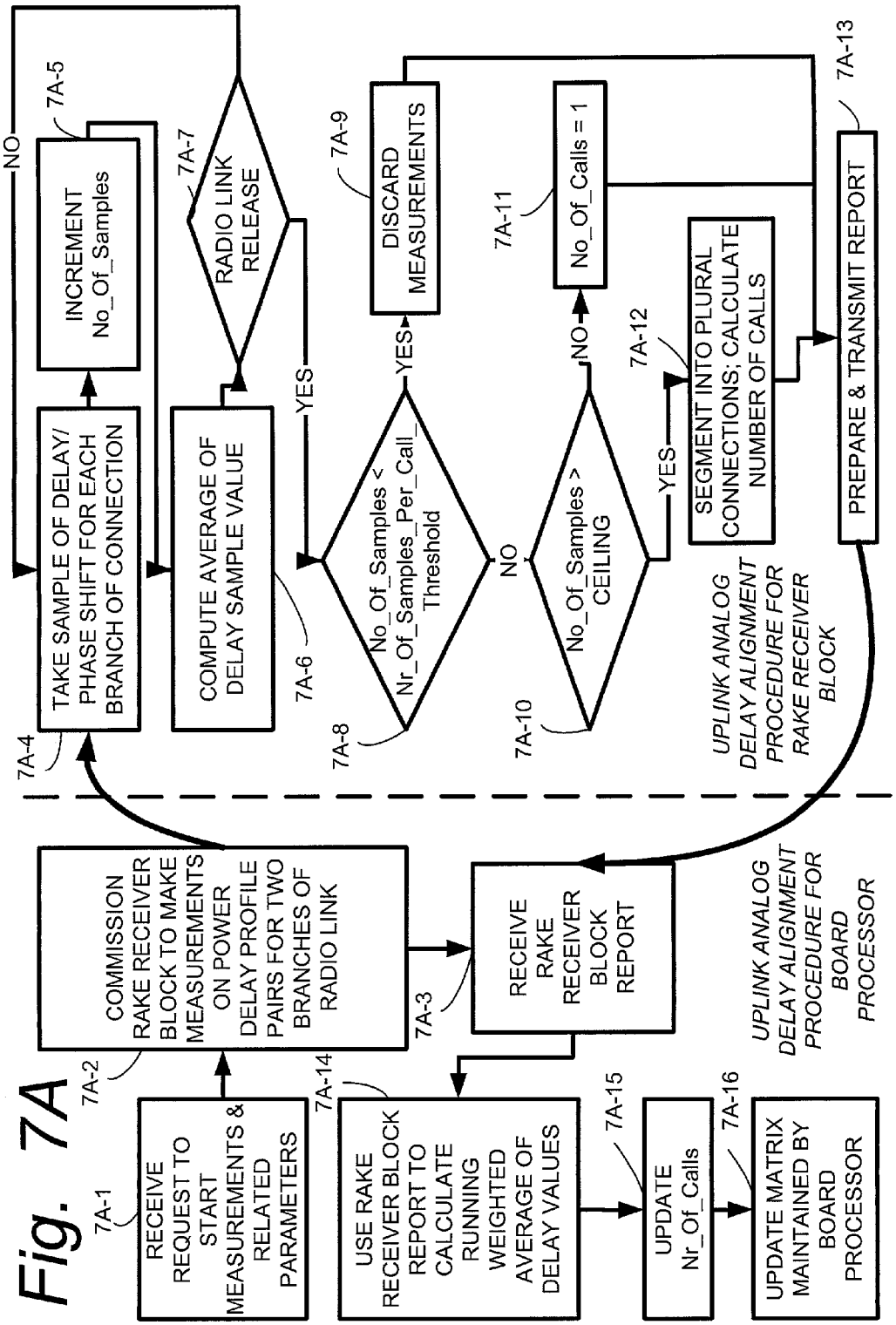
FIG. 7A is a flowchart showing basic steps and events performed in example implementations of an uplink analog delay alignment procedure for a board processor and an uplink analog delay alignment procedure for a rake receiver block.

In showing general steps pertinent to the present invention for the uplink analog delay alignment procedure performed by board processor 64, FIG. 7A shows board processor 64 receiving as action 7A-1 a request to start measurements and certain related parameters which are necessary for performing the measurements. Included among the received parameters are the Nr_Of_Samples_Per_Call_Threshold parameter and the Nr_Of_Samples_Per_Call_Ceiling parameter. The parameter Nr_Of_Samples_Per_Call_Threshold defines the minimum Nr_Of_Samples of measurement that a call needs in order to quality the call to qualify for being reported from the rake receiver block to the board processor 64 (otherwise the measurement is discarded). The parameter Nr_Of_Samples_Per_Call_Ceiling defines the maximum Nr_Of_Samples of measurement before the call will get reported from the rake receiver block to the board processor 64. As explained subsequently, a report for a call with a larger number of samples than Nr_Of_Samples_Per_Call_Ceiling is broken or segmented into plural reports, each having a number of samples no more than Nr_Of_Samples_Per_Call_Ceiling.

As action 7A-2, the board processor 64 commissions the rake receiver block to make measurements on the power delay profiles (PDPs) obtained for the two branches of a radio link. After so commissioning the rake receiver block, in its uplink analog delay alignment procedure the board processor 64 waits until receipt of a report from the rake receiver block, such receipt being shown as action 7A-3.

Before describing how the uplink analog delay alignment procedure as performed by board processor 64 uses the report obtained from the rake receiver block, the uplink analog delay alignment procedure as performed by the rake receiver block is next described with reference to FIG. 7A. Although not shown in FIG. 7A, various parameters are initialized upon the commissioning of execution of the uplink analog delay alignment procedure by the block, such as the parameter Nr_Of_Samples, for example. Moreover, it will be understood that, in conjunction with the commissioning of action 7A-2, various parameters were passed to the rake receiver block. Among these passed parameters are the radio link ID and cell/carrier ID which respectively specify the radio link (e.g., connection) and cell/carrier (e.g., antenna pair) involved in the commissioned measurements.

As action 7A-4, the rake receiver block takes a sample of the delay/phase shift (e.g., PDP) for each branch of the connection (e.g., for each branch of the radio link signal). After taking the sample of action 7A-3, the counter Nr_Of_Samples is incremented at action 7A-5. The delay measurement sample taken at action 7A-4 is added to a running total of delay for the call and cell/carrier, and using such cumulative total and the Nr_Of_Samples parameter, at action 7A-6 an average delay sample value is computed by the rake receiver block.

A determination is then made at action 7A-7 whether a release of the currently sampled radio link (e.g., connection) has occurred. If a release of the radio link has not occurred, at an appropriate interval the uplink analog delay alignment procedure performed by the block returns to action 7A-4 for taking another sample. If a release of the radio link has occurred, post-release processing is performed beginning with action 7A-8.

At action 7A-8 the uplink analog delay alignment procedure executed by the rake receiver block determines whether the Nr_Of_Samples is less than the Nr_Of_Samples_Per_Call_Threshold. If the determination at action 7A-8 is negative, as action 7A-9 the measurements for the call are discarded. If the determination at action 7A-8 is positive, the uplink analog delay alignment procedure performed by the rake receiver block determines whether the results for the call can be reported in a single report, or whether the Nr_Of_Samples for the call is so great as to require that the call be considered as plural calls, for which a separate report will be generated for each of the so-considered plural calls.

As action 7A-10, the rake receiver block ascertains whether the Nr_Of_Samples exceeds the Nr_Of_Samples Per Call_Ceiling parameter. If the determination at action 7A-10 is negative, then (as reflected by action 7A-11) the call will be treated as a single call (e.g, the Nr_Of_Calls parameter is set equal to one). On the other hand, if the determination at action 7A-10 is positive, for reporting purposes at action 7A-12 the call will be segmented into plural calls (e.g., effectively treated as plural connections). The action 7A-12 shows that a parameter Nr_Of_Calls is calculated. The Nr_Of_Calls parameter is the total number of calls on which a delay difference in each sector and receiver board 60 has been measured. After the determination of action 7A-12, as shown by action 7A-13 a report regarding the uplink analog delay alignment procedure for the rake receiver block is prepared and transmitted to main processor 70. The report of action 7A-13 includes, e.g., the Nr_Of_Samples, the average delay sample value, and Nr_Of_Calls.

As an example of execution of action 7A-12, consider a call which has a number of samples (Nr_Of_Samples) which is more than the Nr_Of_Samples_Per_Call_Ceiling parameter, for example, a number of samples which is 1.7 times the Nr_Of_Samples_Per_Call_Ceiling parameter. In accordance with the logic of the uplink analog delay alignment procedure for the rake receiver block as above described, the call will be regarded (e.g., at action 7A-12) as two calls: a first call having a number of samples equal to the Nr_Of_Samples_Per_Call_Ceiling parameter, and a second call having a number of samples equal to 0.7 times the Nr_Of_Samples_Per_Call_Ceiling parameter.

After receiving at action 7A-3 the report from the rake receiver block, as action 7A-14 the uplink analog delay alignment procedure performed by board processor 64 uses the report to calculate a running weighted average of delay values. The calculation of action 7A-14 is based on a previous running weighted average of delay values, plus the average delay sample value, the Nr_Of_Samples weight, and the Nr_Of_Calls parameter included in the report of action 7A-13. The values are only calculated per calculation instance based on the reports from all RAX boards at that specific time.

As action 7A-15, the uplink analog delay alignment procedure performed by board processor 64 updates its cumulative count of the Nr_Of_Calls. Then, as action 7A-16, the board processor 64 updates a database or matrix which it maintains.

Figure 8:
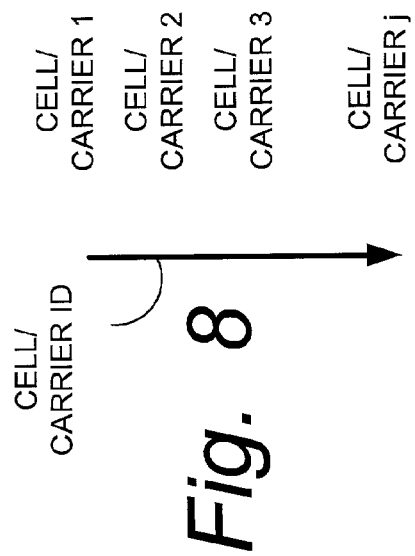
FIG. 8 is a diagrammatic view of an example format of a database stored in a local memory of a receiver board.

An example format for the database or matrix maintained by board processor 64 is illustrated in FIG. 8. For each cell/carrier, the database includes the following pertinent fields: an average delay value; Nr_Of_Samples, and Nr_Of_Calls. The example database of FIG. 8 shows storage of information for j number of cell/carriers handled by the corresponding receiver board (RAX) 60.

Figure 7B:
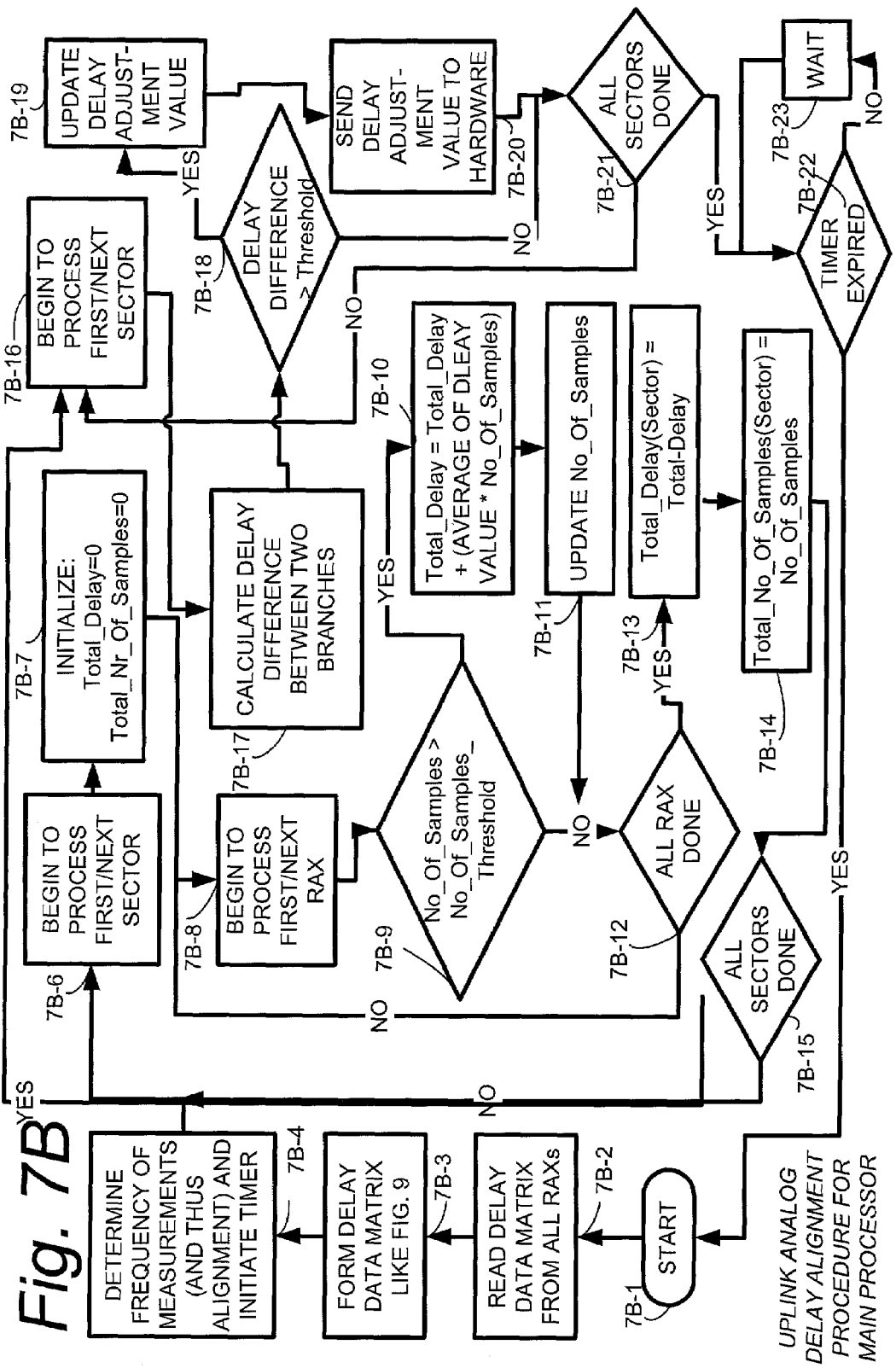
FIG. 7B is a flowchart showing basic steps and events performed in example implementations of an uplink analog delay alignment procedure for a main processor of a base station site.

FIG. 7B shows general steps and actions performed by the uplink analog delay alignment procedure executed by main processor 70, and particularly by delay alignment unit 72. The action 7B-1 of FIG. 7B depicts the start of the uplink analog delay alignment procedure executed by (or primarily by) delay alignment unit 72. Upon starting, the uplink analog delay alignment procedure reads the delay data matrix maintained by each receiver board 60 (more particularly, maintained by each board processor 64). An example of such delay data matrix has been previously described with reference to FIG. 8, for example. For each cell/carrier and each RAX (e.g., receiver board 60), at action 7B-2 the delay alignment unit 72 obtains the average delay value; the Nr_Of_Samples, and the Nr_Of_Calls. Upon receiving such data from all receiver boards 60 included in the receiver board pool 80, as action 7B-3 the delay alignment unit 72 constructs or forms its own delay data matrix. An example format for such delay data matrix formed by delay alignment unit 72 is illustrated in FIG. 9.

Figure 9:
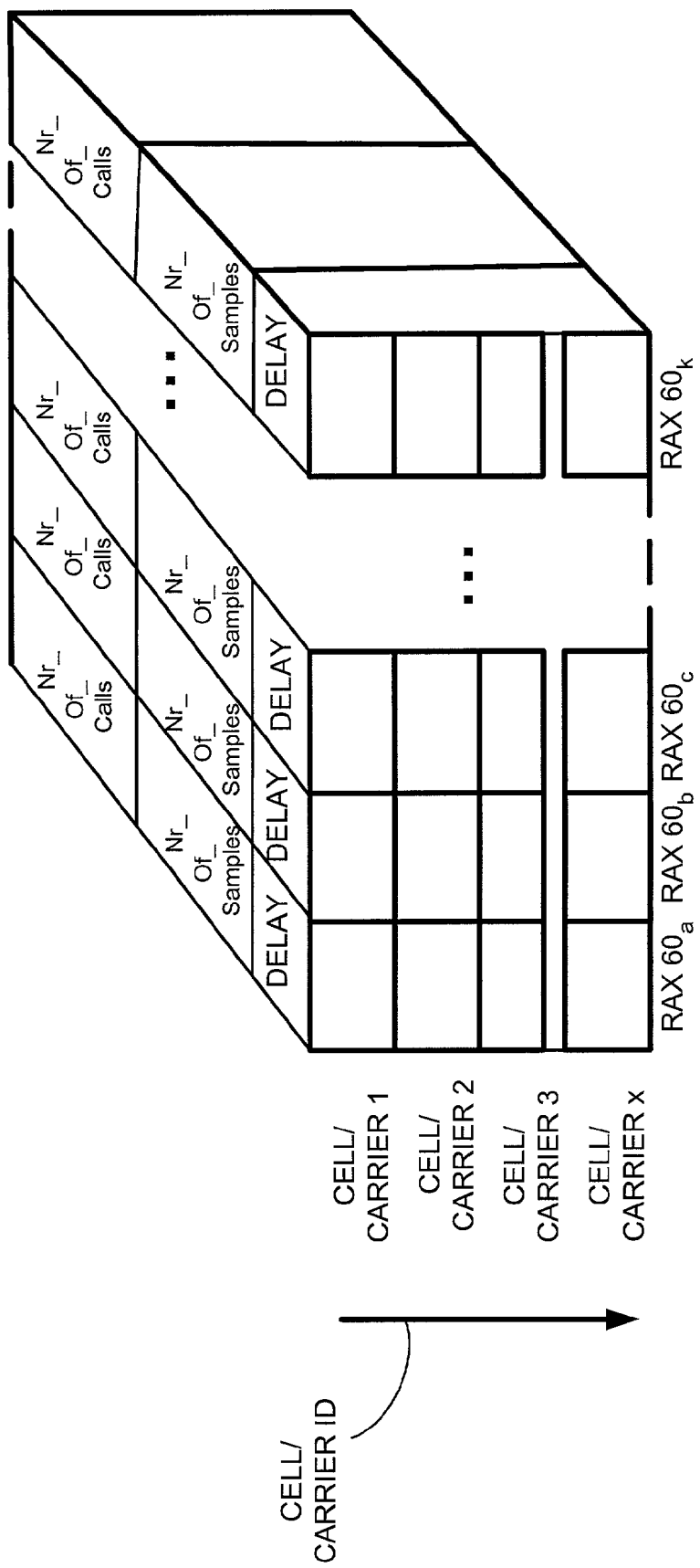
FIG. 9 is a diagrammatic view of an example format of a database stored in a main processor of a base station site.

The matrix of FIG. 9 is a three dimensional matrix. In the matrix of FIG. 9, a first dimension shown as the vertical dimension is associated with cell/carriers. For example, the first horizontal row at the top of the matrix is associated with a first cell/carrier, the second horizontal row therebeneath is associated with a second cell/carrier, and so on. The database of FIG. 9 shows storage of information for x number of cell/carriers. A second dimension shown as the horizontal dimension in FIG. 9 is associated with RAXes (e.g., receiver boards 60). For example, a first slice along the depth of the matrix contains data collected from a first receiver board $60_a$, a second slice (to the right of the first slice moving to the right in FIG. 9) contains data collected from a second receiver board $60_b$, and so forth. Each slice essentially resembles the matrix of FIG. 8 as maintained by the respective receiver board 60. The data of the matrix resides in the depth dimension of the matrix. The data items include those of the matrix of FIG. 8, e.g., the average delay value, the Nr_Of_Samples, and the Nr_Of_Calls.

Many of the remaining actions of the uplink analog delay alignment procedure as described in FIG. 7B are performed based on the data stored in the matrix maintained by delay alignment unit 72 (an example of which appears in FIG. 9). As described hereinbelow, the data is accessed in terms of cell/carriers and RAX boards (e.g., receiver boards 60).

As action 7B-4, the uplink analog delay alignment procedure determines the frequency of measurements to be made (and thus the frequency with which alignment values are to be applied to the sector signal processing section 40). Such frequency is determined by consulting a parameter BRANCH_DIFF_Timer. The BRANCH_DIFF_Timer is set or otherwise input by a service provider and defines the frequency with which the measurements are read by delay alignment unit 72 from the receiver board 60. As part of action 7B-4, the delay alignment unit 72 initializes its internal timer $T_{Branch\_diff\_Timer}$ to the value of BRANCH_DIFF_Timer.

The actions 7B-6 to and including action 7B-15 form a loop, with certain actions of the loop, as appropriate, being performed for each cell/carrier of the radio base station. In other words, each execution of the loop of actions 7B-6 to and including action 7B-15 is associated with a particular cell/carrier of the radio base station. The loop begins with action 7B-6, and is followed by certain initialization steps performed as action 7B-7. Among the initialization steps performed as action 7B-7 are those of initializing the parameters Total_Delay and Total_Nr_Of_Samples at zero. The Nr_Of_Samples is the total number of measured delay difference samples for each sector and RAX. The Total_Delay is the sum of all delay differences for one cell/carrier during one report period.

After the initialization of action 7B-7, the uplink analog delay alignment procedure performed by delay alignment unit 72 executes a nested loop comprising action 7B-8 through and including action 7B-12. Each execution of the loop comprising action 7B-8 through and including action 7B-12 pertains to a particular one of the receiver boards (RAXs) 60. Being nested in the cell/carrier loop (extending from action 7B-6 to action 7B-15), the steps of the nested loop are thus performed relative both to cell/carrier and RAX.

As action 7B-9, a determination is made whether the Nr_Of_Samples exceeds the Nr_Of_Samples_Threshold. The Nr_Of_Samples_Threshold is a parameter which defines the minimum number of samples (e.g., the minimum value for Nr_Of_Samples) required from each cell/carrier in each RAX board in order for the measurement from that certain cell/carrier and that RAX to be included in the measurement reports. If the determination at action 7B-9 is positive, action 7B-10 and action 7B-11 are performed before reaching action 7B-12. At action 7B-10, the value for Total_Delay is updated, while at action 7B-12 the value of the parameter Nr_Of_Samples is updated. The nested loop comprising action 7B-8 through and including action 7B-12 is performed for each RAX board (e.g., for each receiver board 60 in receiver board pool 80, or at least for those appropriate). At action 7B-12 the uplink analog delay alignment procedure checks whether all such RAX boards have been taken into consideration, and (if not) repeats the nested loop for the next RAX board by returning to action 7B-8. When all RAX boards have been processed for a sector, processing continues with action 7B-13.

The following logic exemplifies the calculations performed by action 7B-10 and action 7B-11:

For RAX_Nr=1 to Max_RAX_Nr
  If (A[cell/carrier_ID,RAX_Nr].Nr-Of-Samples>Nr_Of_Samples_Threshold and A[cell/carrier_ID,RAX_Nr]
    .Nr_Of_Calls>Nr_Of_Calls_Threshold),
  then
    Total_Delay=Total_Delay+A[cell/carrier_ID,RAX_Nr]
    .Delay*A[cell/carrier_ID,RAX_Nr].Nr_Of_Samples
    Total_Nr_Of_Samples=Total_Nr_Of_Samples+A[cell/carrier,RAX_Nr].Nr_Of_Samples
  Endif In the foregoing, parameters not yet described have the following meanings: RAX_Nr identifies a particular RAX board (e.g., receiver board 60). MAX_RAX_Nr defines the number of RAX boards for which the nested loop is appropriate (e.g., likely k number of RAX boards, such being the number in the receiver board pool 80). Nr_Of_Calls_Threshold is a threshold which defines the minimum number of calls (Nr_Of_Calls) required for each report from each cell/carrier in each RAX board in order for the measurement from that certain cell/carrier within that certain RAX to be included in the measurement reports.

The action 7B-13, performed after the nested loop has been performed for all RAX boards (e.g., receiver boards 60), involves loading the total delay accumulated for a cell/carrier (with data from all RAX boards now having been taken into consideration) into an array Total_Delay(cell/carrier). Similarly, as action 7B-14, the Nr_Of_Samples accumulated for the cell/carrier is stored in an array Nr_Of_Samples(cell/carrier).

The action 7B-15 involves the delay alignment unit 72 checking whether the loop comprising action 7B-6 to and including action 7B-15 has been performed for all cell/carriers. If other cell/carriers remain for processing, another execution of the loop is performed (e.g., processing returns to action 7B-6). When all cell/carriers have been processed, execution resumes at action 7B-16.

The action 7B-16 actually beings another cell/carrier-based loop. Such second cell/carrier-based loop commences with action 7B-16 and continues through and including action 7B-21. After the loop is begun (action 7B-16), at action 7B-17 the delay alignment unit 72 calculates, for a cell/carrier which is a subject of the particular iteration of the loop, a delay difference between the two branches. In other words, for action 7B-17 the delay alignment unit 72 performs a calculation such as the following:

$T_{Branch\_diff(cell/carrier)}$=Total_Delay(cell/carrier)/Total_Nr_Of_Samples(cell/carrier)

After calculating the delay difference between branches for a cell/carrier, as action 7B-18 a check is made whether the delay difference between branches for a sector (e.g., $T_{Branch\_diff(cell/carrier)}$) exceeds a threshold ($T_{Branch\_diff\_Threshold}$). The parameter. $T_{Branch\_diff\_Threshold}$ is the smallest delay difference required for attempting to update the delay adjustment value in the delay adjustment buffer 55. If the determination at action 7B-18 is positive, e.g., if the threshold ($T_{Branch\_diff\_Threshold}$) is exceeded, action 7B-19 and action 7B-20 are performed prior to performing action 7B-21. Otherwise, if the determination at action 7B-18 is negative, e.g., if the threshold ($T_{Branch\_diff\_Threshold}$) is not exceeded, action 7B-21 is immediately performed.

At action 7B-19 the delay adjustment value for the cell/carrier can be updated using a generalized calculation such as the following:

$T_{TRX\_RF\_UL}$[cell/carrier+0]=$T_{TRX\_RF\_UL}$[cell/carrier+0]+$T_{Branch\_diff}$[cell/carrier+0]

A more accurate procedure for updating the delay adjustment value is reflected by the steps shown in Table 1.

At action 7B-20, the delay adjustment value, e.g., $T_{TRX\_RF\_UL}$[Sector+0], is sent to the hardware. Reference is again made to event 6-4 in the example of FIG. 6, wherein the delay adjustment value is applied to one of the delay adjustment buffers 55 in the sector signal processing section 40, e.g., the buffer 55 which, prior to the adjustment, had the shortest delay value.

The action 7B-21 involves a check whether the loop comprising action 7B-16 through and including action 7B-21 has been performed for all cell/carriers. If not, execution returns to action 7B-16 for the next cell/carrier to be processed. Otherwise, when all cell/carriers have been processed, execution proceeds to action 7B-22.

At action 7B-22 the timer ($T_{Branch\_diff\_Timer}$) is consulted. This timer was initialized at action 7B-4, and indicates the frequency with which, e.g., adjustments are to be performed. If the timer has not yet timed out, the uplink analog delay alignment procedure waits as indicated at action 7B-23 until timeout. When the timer ($T_{Branch\_diff\_Timer}$) has timed out, the uplink analog delay alignment procedure is again executed by delay alignment unit 72. Such repeated execution is depicted in FIG. 7B by a return to action 7B-1.

The delay adjustment means included in the sector signal processing front end 46 has been described in the aforementioned embodiments as taking an example form of a delay adjustment buffer. Other suitable implementations are also encompassed.

FIG. 3 shows certain examples of components included in a particular implementation of the signal processing hardware of a sector signal processing front end. The present invention is not limited by the exact identity, nature, or arrangement of components included in the signal processing hardware of a sector signal processing front end 46.

The first embodiment of the invention thus achieves a better precision in delay alignment. As noted above, the rake receiver in the RAX board 60 is employed to measure the delay difference between the two branches for each cell/carrier (e.g., the antenna pair) for each radio link. The invention provides enhanced accuracy, e.g., within a couple of nanoseconds. The measurements are executed frequently and could be executed essentially constantly. The timing of the measurements is configurable and can be configured, e.g., such that it would only to measure essentially constantly. The measurements are stored in a matrix by the receiver board 60 in the manner shown in FIG. 9. Thereafter, these board-based measurements are processed by main processor 70, and more particularly by delay alignment unit 72, to obtain the delay adjustment values for each cell/carrier. The calculated delay adjustment values are sent to the delay adjustment buffer 55 for the appropriate branch. Accordingly, the residual delay difference after the alignment is equal to the following expression: Measurement accuracy+Adjustment step size+angle of arrival variance.

Whereas at least one example of the first embodiment envisions measuring the delay difference with respect to branches of radio link signals for plural calls (e.g., plural connections), preferably involving plural user equipment units, a second invention measures the delay difference with respect to two branches of a radio link signal emanating from a test user equipment unit. The test user equipment unit is situated at a close and substantially equal distance from the two diversity antennas with a fairly good accuracy, i.e., a couple of nanoseconds. In other words, the test user equipment unit is situated essentially equidistantly from the two diversity antennas.

Figure 10:
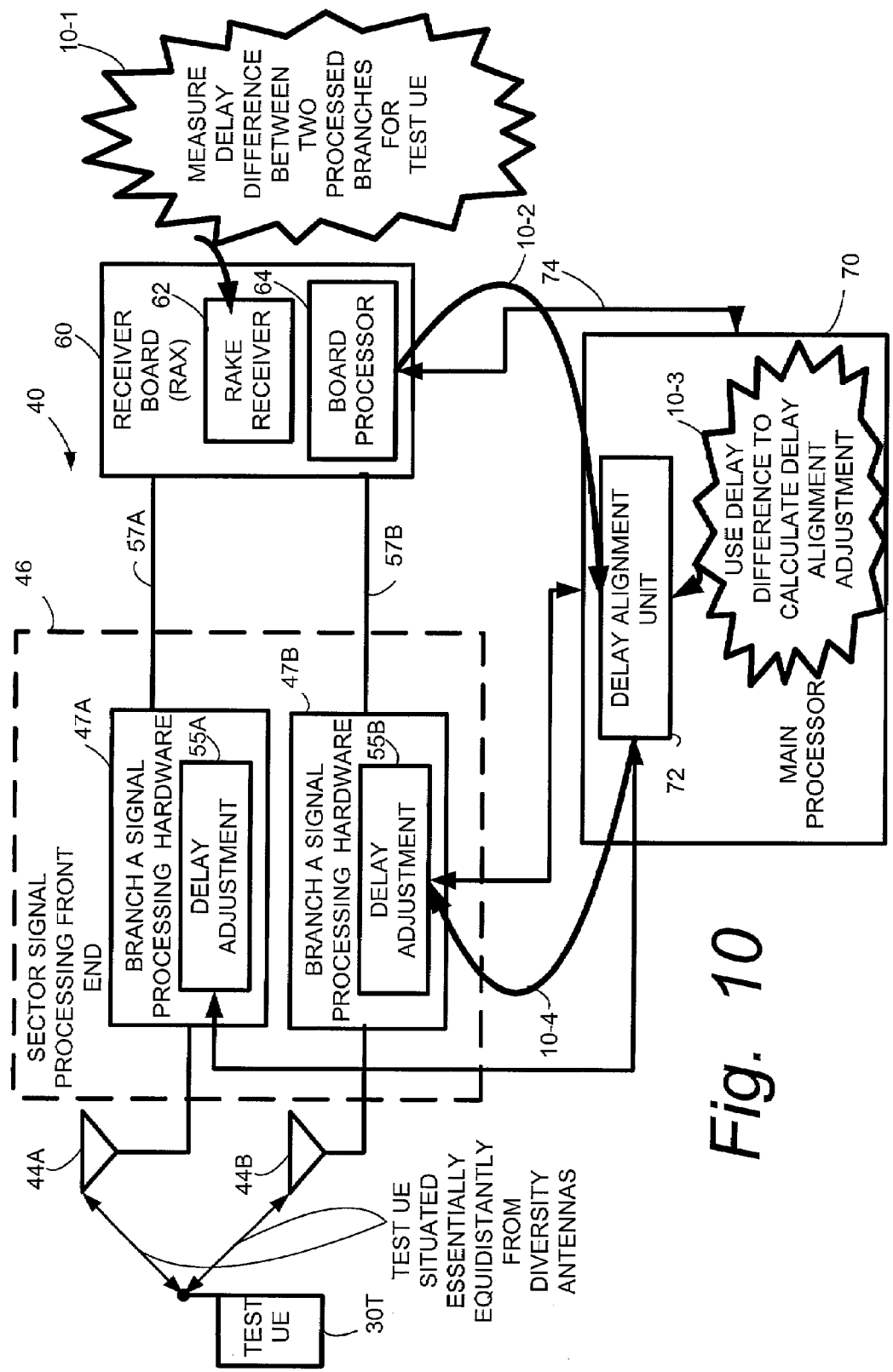
FIG. 10 is a schematic view of sector signal processing section for an example sector for illustrating basic aspects of a second embodiment of the invention.

FIG. 10 shows basic aspects of the second embodiment of the invention, including the test user equipment unit 30T which is situated essentially equidistantly between the two diversity antennas 44A and 44B of a sector. For the specified cell/carrier involved in the test or calibration, the rake receiver 62 allocated to the cell/carrier measures the delay difference between the two processed branches of the radio link signal emanating from the test user equipment unit 30T, e.g., measures the delay difference between the signals on lines 57A, 57B. The remaining operations of the second embodiment are essentially similar to those of the first embodiment (FIG. 6), it being understood that a substantial difference is that the second embodiment makes the delay difference measurements only with respect to the test user equipment unit 30T (rather than with respect to plural user equipment units, as occurred in at least one mode of the first embodiment). Such measurement of delay difference for the second embodiment is depicted as event 10-1 in FIG. 10. The delay difference is utilized (e.g., by a processor) to determine a delay alignment adjustment value. Event 10-2 shows the measured delay difference (or a value derived therefrom, such as an average or weighted average delay difference) being transmitted to main processor 70. Event 10-3 shows main processor 70, and particularly delay alignment unit 72, using the delay difference to calculate a delay alignment adjustment. As event 10-4, the delay alignment adjustment value is applied to the appropriate one of the two branches of signal processing hardware, for example to delay alignment buffers 55B included in branch 47B of the signal processing hardware.

A third embodiment of the invention also uses the test user equipment unit 30T to determine diversity branch delay difference, and for the further purpose of estimating an angle of arrival for the signal received from other user equipment units. Having statistical metrics on the angle of arrival distribution for user equipment unit traffic generally can help a service provider optimize cell planning and achieve more efficient utilization of the radio frequency resources. Traditionally there has been no precise measurement on the distribution of the angle of arrival at the base station, and consequentially cell planning is based on a rough estimate made prior to putting up the radio base station and using inaccurate empirical criteria.

The third embodiment allows the service provider to obtain an estimate over the distribution angle of arrival of the incoming signals to the radio base station's receive antennas. In essence, according to the third embodiment the delay skew between two diversity branches of incoming signals from the user equipment unit (UE) in the field are measured by rake receivers in the receiver board 60, and compared with those transmitted by a test user equipment unit (UE). As in the second embodiment, the test user equipment unit (UE) is positioned essentially equidistantly relative (preferably in front of) to the receive antennas, and the delay difference measured by the rake receiver permits measurement of a signal delay ($delay_{HW}$) attributable to the hardware in the respective hardware branches of the sector signal processing section 40. The sector also receives radio link signals from non-test (actual traffic) user equipment units, with the rake receiver also measuring the delay difference for the diversity branches of the processed radio link signal from the non-test user equipment units. The measured delay difference for the diversity branches of the processed radio link signal from the non-test user equipment units is considered as a total delay ($delay_{TOTAL}$). By subtracting the hardware signal delay component ($delay_{HW}$) discerned from the test user equipment unit (UE) from the total delay ($delay_{TOTAL}$) discerned with respect to the non-test user equipment units, a delay component attributable to the angle of arrival ($delay_{AOA}$) is determined. From the delay component attributable to the angle of arrival ($delay_{AOA}$), the angle of arrival itself (AOA) is determined.

Figure 12:
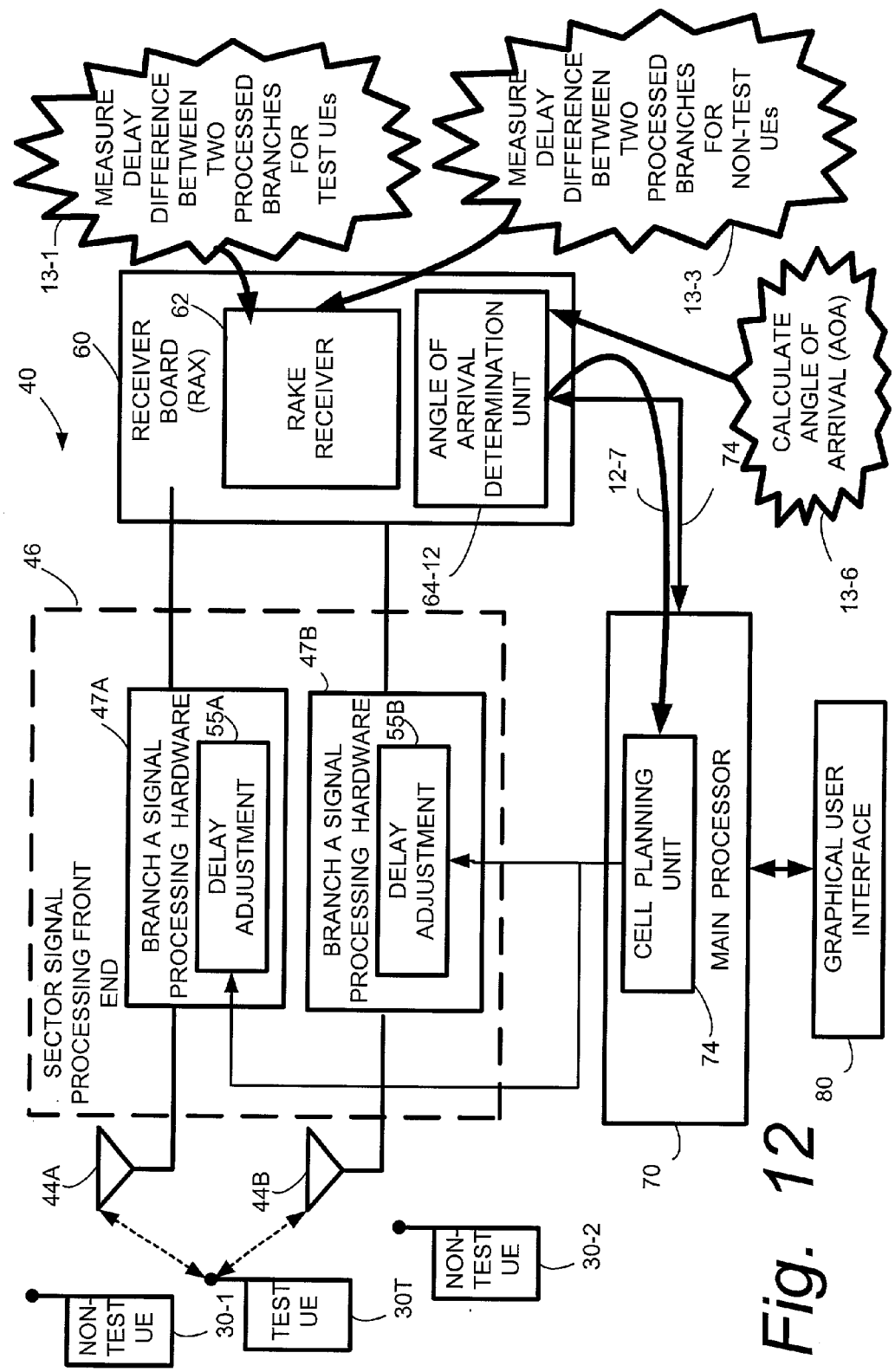
FIG. 12 is a schematic view of sector signal processing section for an example sector for illustrating basic aspects of a third embodiment of the invention wherein angle of arrival is determined for user equipment units in the field of the sector.
Figure 13:
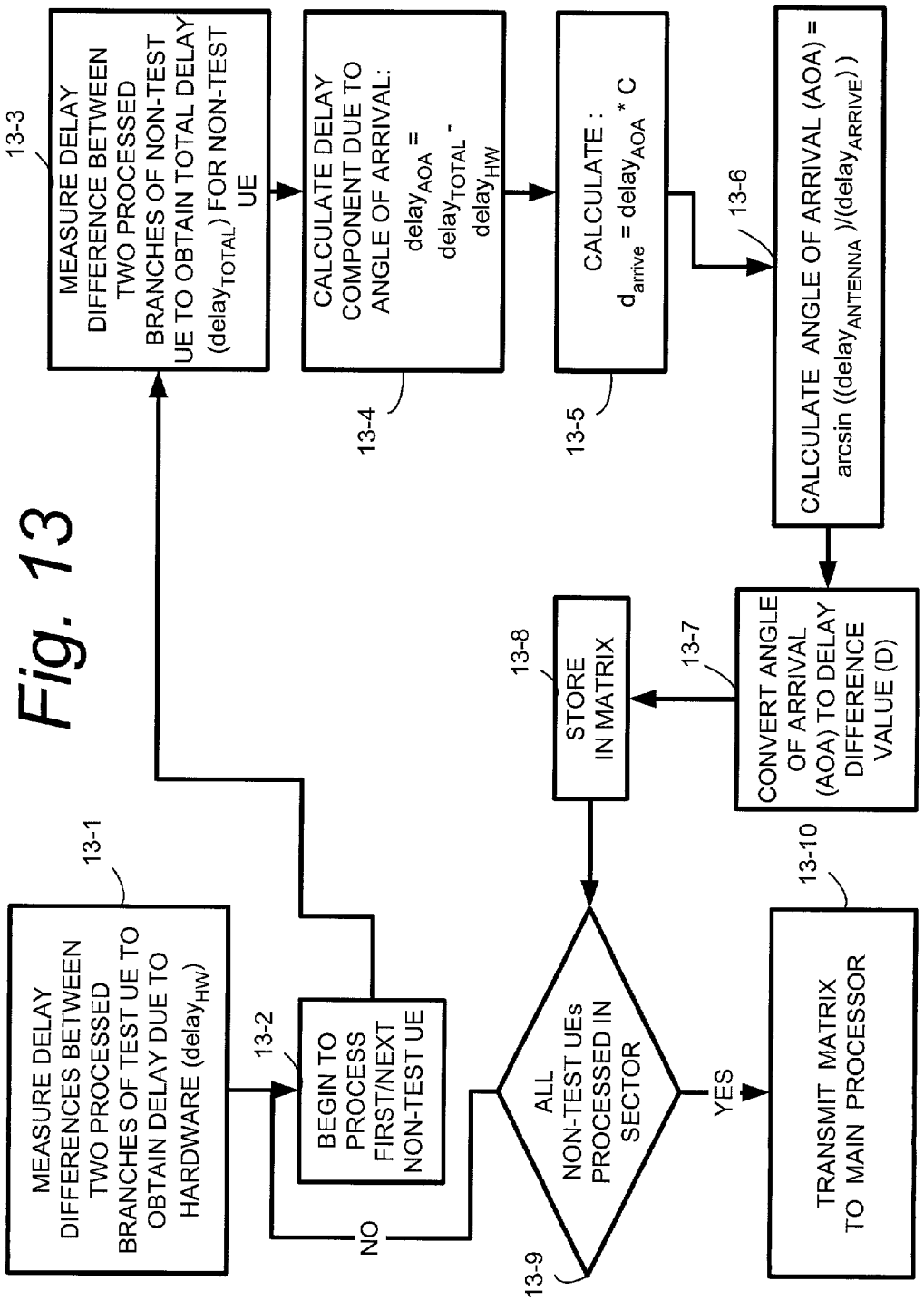
FIG. 13 is a flowchart showing certain basic steps and events performed in the third embodiment.

FIG. 12 and the flowchart of FIG. 13 show certain basic aspects of the third embodiment of the invention. In one implementation of the invention, the actions reflected by FIG. 13 are implemented by the receiver board 60, with certain measurements hereinafter described performed by the rake receiver 62 and calculations performed by an angle of approach determination unit 64-12. In one alternative implementation of the invention, the angle of approach determination unit 64-12 can take the form of board processor 64, previously described.

Like in the second embodiment, in the third embodiment the test user equipment unit 30T is situated essentially equidistantly between the two diversity antennas 44A and 44B of a sector. But unlike the second embodiment, the third embodiment involves other user equipment units (UE) as well, particularly illustrated as non-test user equipment units 30-1 and 30-2 which are present in the same sector and which use the same cell/carrier as the test user equipment unit 30T. For sake of simplicity, only two non-test user equipment units (UE) 30 are shown in FIG. 12, it being understood that another number (e.g., likely a greater number) of user equipment units (UE) are served by the sector of interest at any given time.

As in the second embodiment, in the third embodiment the rake receiver 62 allocated to the cell/carrier utilized by the test user equipment unit (UE) 30T measures the delay difference between the two processed branches of the radio link signal emanating from the test user equipment unit 30T. Such measurement of delay difference with respect to the test user equipment unit (UE) 30T for the third embodiment is depicted as event 13-1 in FIG. 12 and FIG. 13.

The third embodiment also involves measurement of the delay difference between the two processed branches of the radio link signals emanating from the non-test user equipment units (e.g., UE 30-1 and UE 30-2). The processing of the non-test user equipment units (UE) is depicted in the flowchart of FIG. 13 by a loop which commences with action 13-2 through and including action 13-9.

The action 13-2 reflects handing of the first non-test user equipment unit (UE) (or, for subsequent executions of the non-test loop, a next non-test user equipment unit (UE) to be processed). As action 13-3, the rake receiver 62 measures the delay difference between the two processed branches of the non-test user equipment unit (UE) (e.g., one of UE 30-1 and 30-2 in FIG. 12) to obtain a total delay (delay$_{TOTAL}$) for that particular non-test user equipment unit (UE). The measurement of action 13-3 is performed in virtually the same manner as that of action 13-1, it being understood however that the measurement of action 13-1 was for the test user equipment unit (UE) 30T, while the measurement of action 13-3 is for the non-test user equipment unit (UE).

Figure 11:
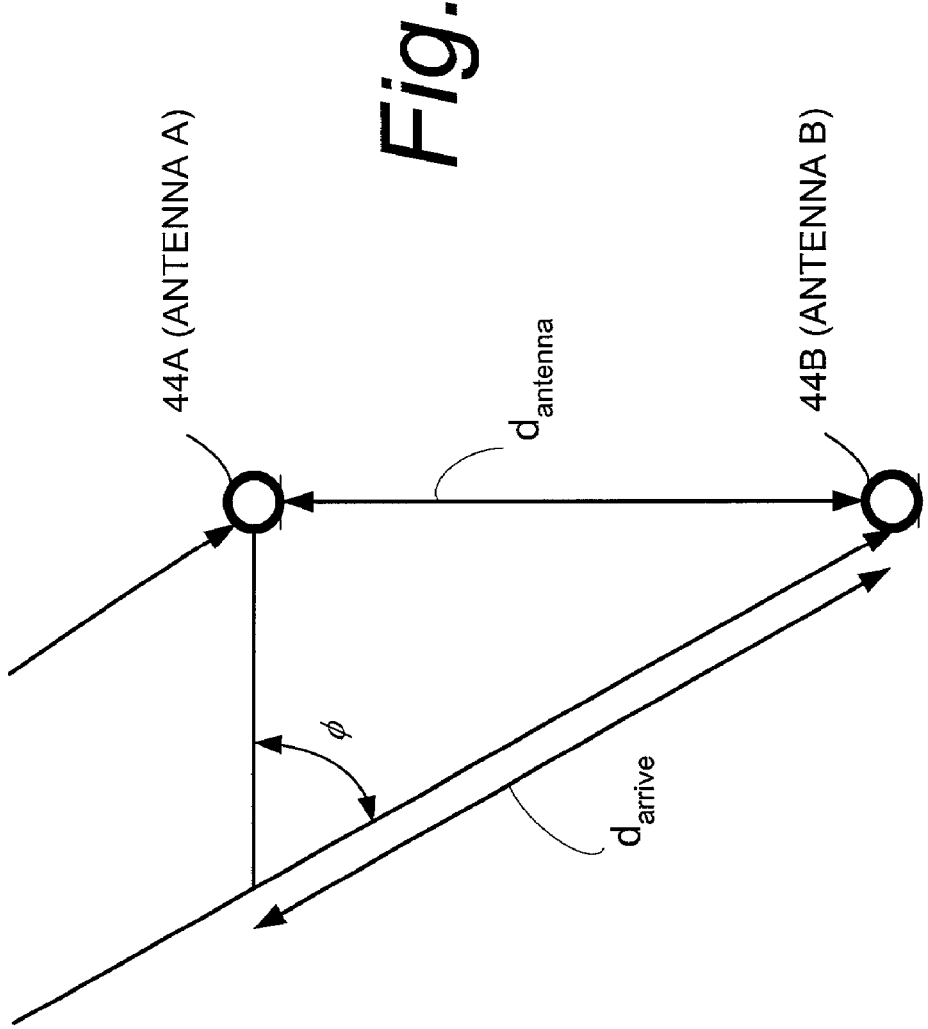
FIG. 11 is a diagrammatic view showing certain geometric relationships and distances used to calculate an angle of arrival for a sector having two diversity antennas.

Various other actions included in the non-test UE loop of FIG. 13 are understood with reference to the geometric depiction of FIG. 11. If the elevation angle is neglected, the azimuthal angle of arrival Φ can be calculated using the two diversity antenna branches in accordance with Expression 1. In Expression 1, Φ is the azimuthal angle of arrival; $d_{antenna}$ is the distance between the two diversity antennas, and $d_{arrive}$ is the projection of $d_{antenna}$ on the direction at which the signal approaches the antenna (see FIG. 11).

$$\Phi = a\cos((d_{antenna})/(d_{arrive}))$$
Expression 1

The action 13-3 above described essentially involves the rake receiver 62 determining the delay difference measurement between the two branches of a non-test user equipment unit (UE), which delay difference is a skew or delay$_{TOTAL}$ for the non-test UE. As understood from Expression 2, this skew or delay$_{TOTAL}$ includes two components: (1) a first component (delay$_{AOA}$) which is contributed by the angle of arrival; (2) a second component (delay$_{HW}$) which is contributed by the hardware delay difference between the two branches.

$$\text{delay}_{TOTAL} = \text{delay}_{AOA} + \text{delay}_{HW}$$
Expression 2

The second component of the skew, i.e., the component contributed by the hardware delay difference between the two branches (delay$_{HW}$), was calculated at action 13-1 as the measurement on a link which is set up by the test user equipment unit (UE) 30T (which, it will be recalled, is positioned substantially equidistantly in front of the two diversity antenna). Thus, in accordance with Expression 2, as action 13-4 the delay$_{HW}$ component (known from action 13-1) is subtracted from the total skew (i.e., delay$_{TOTAL}$) measured for a non-test user equipment unit, to yield the delay difference due to the angle of arrival (delay$_{AOA}$) for the non-test user equipment unit.

Knowing the delay difference due to the angle of arrival (delay$_{AOA}$) after the calculation of action 13-4, as action 13-5 the parameter $d_{arrive}$ is calculated in accordance with Expression 3. In Expression 3, "C" is the speed of light.

$$d_{arrive} = \text{delay}_{AOA} * C$$
Expresison 3

At this point both $d_{antenna}$ and $d_{arrive}$ are known. The parameter $d_{antenna}$ is known from simple length measurement at the radio base station. The parameter $d_{arrive}$ is known from the result of the calculation of action 13-5. With both $d_{antenna}$ and $d_{arrive}$ known, as action 13-6 these values are inserted in Expression 1, thereby enabling determination of the azimuthal angle of arrival Φ.

Figure 14:
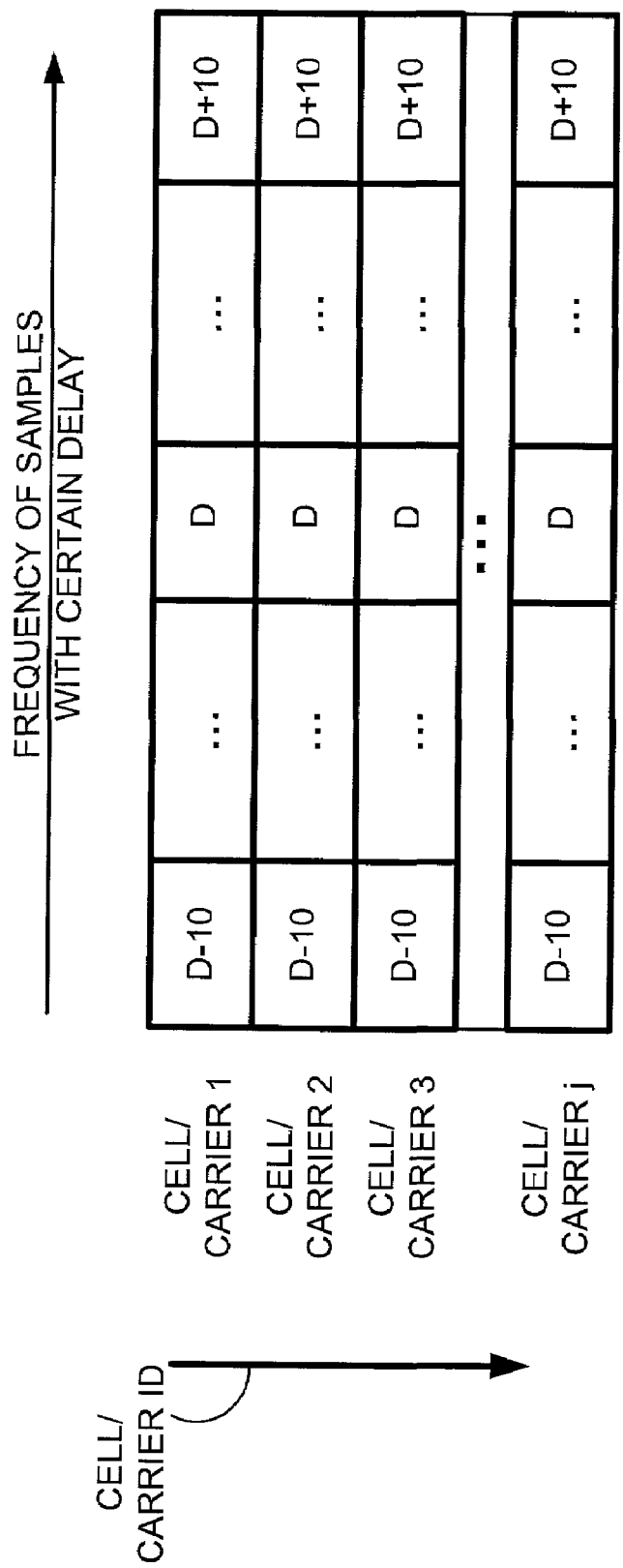
FIG. 14 is a diagrammatic view of an example format of a database maintained in conjunction with the third embodiment.

As action 13-8, the angle of approach determination unit 64-12 sorts the delay values due to angle of arrival (AOA) into one of several delay value ranges, and then increments a counter associated with the appropriate range. In so doing, a count of the number of occurrence for each delay value range is maintained. Such counts are stored as the number of occurrences in a matrix. FIG. 14 illustrates an example format of such a matrix for a multi-sector (Change to cell/carrier) radio base station in which a receiver board 60 serves the plural sectors (Change to cell/carriers). In the matrix of FIG. 14, "D−10" represents the frequency (e.g., number) of samples where Branch B−Branch A equals −10 nanoseconds; "D+10" represents the frequency (e.g., number) of samples where Branch B−Branch A equals +10 nanoseconds; and so forth.

As action 13-9, a check is made whether all non-test user equipment units (UE) in the sector using the specified cell/carrier that are to be processed have been processed (e.g., that the non-test UE loop has been executed for all non-test UEs). If the result of the check of action 13-9 is negative, execution returns to action 13-2 for processing of a next non-test UE. Otherwise, as action 13-10 the stored values obtained during this session are transmitted to a centralized data collection agent, e.g., main processor 70 in the illustrated implementation. For the illustrated implementation, the stored values can take the form of the very data matrix stored by the angle of approach determination unit 64-12, e.g., the form of FIG. 14, for example.

The actions of FIG. 13 can be performed at a frequency as required by the service provider or network operator, e.g., at a pre-defined frequency. In accordance with one implementation, the centralized data collection agent, e.g., main processor 70, sums up the data received in each report from the receiver board 60. For example, main processor 70 can maintain a matrix much like that of FIG. 14 which stores cumulative values rather than session values. An interface such as graphical user interface 80 connected to main processor 70 can be used to display or output the cumulative results in various forms. One example output or display form is that of a histogram which can be utilized for cell planning optimization.

Variations of the foregoing embodiments, including the third embodiment, are within the scope of the present invention. For example, as illustrated in FIG. 13, the processing of the non-test UE loop normally occurs after action 13-1. However, the logic could be alternatively configured so that the rake receiver measurements for the non-test user equipment units (UE) are made at substantially the same time as the measurements for the test user equipment unit (UE) 30T, it being understood however, that subsequent actions (e.g., actions 13-4 and following) require the measurement of action 13-1 for completion.

The third embodiment thus allows a service provider to conduct measurements on each radio base station and obtain a fairly accurate estimate of the distribution of angle of arrival, and thereby obtain an estimate of the traffic geographical distribution. This analysis can then be used as input for optimization of cell planning.

Figure 15:
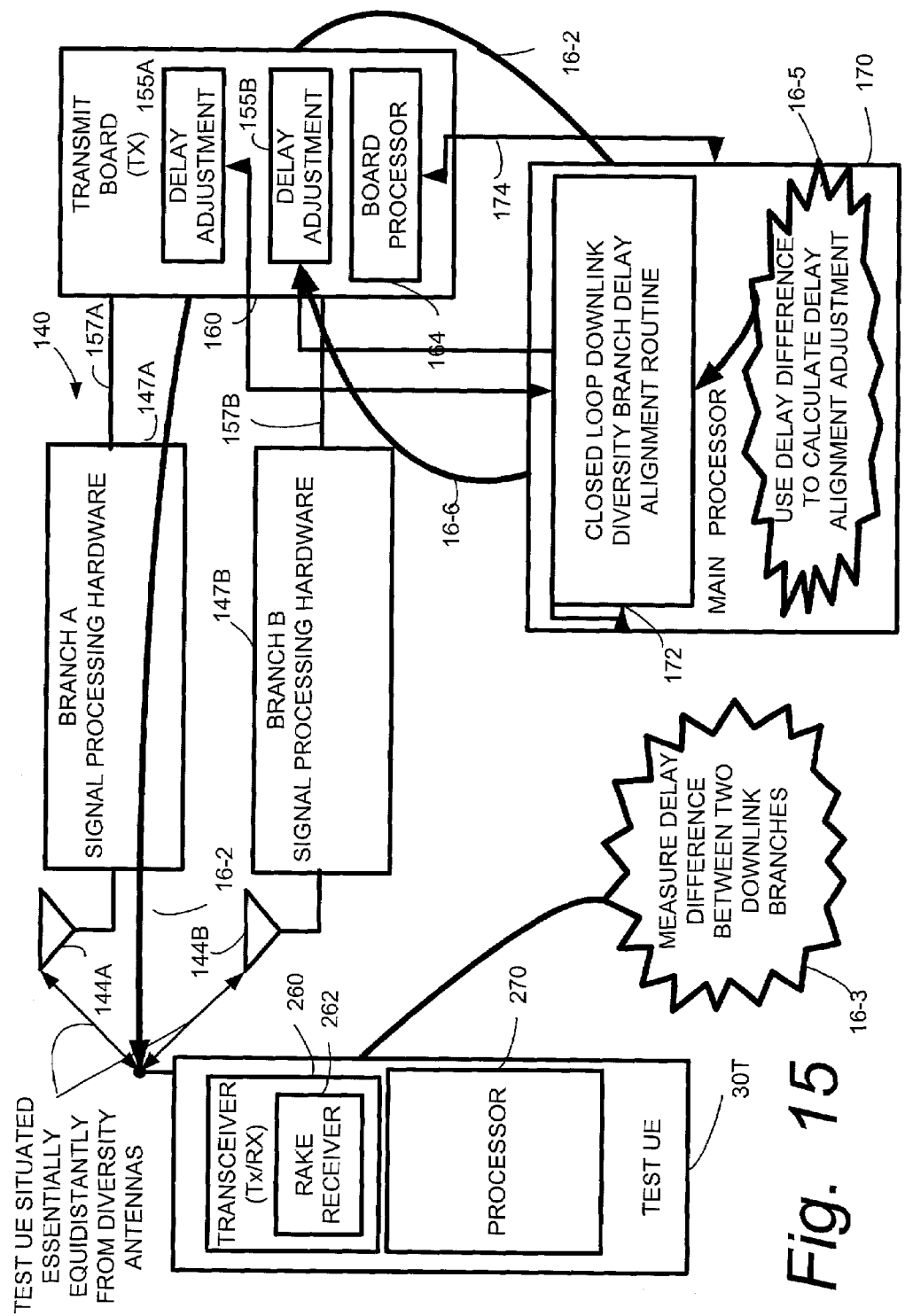
FIG. 15 is a schematic view of portions of a test user equipment unit and a sector signal processing section for an example sector for illustrating basic aspects of a forth embodiment of the invention wherein a downlink diversity branch delay alignment routine is performed.

Whereas the embodiments previously described all pertain, at least to some degree, to measuring an uplink delay difference between branches of a sector having diversity antenna, the fourth embodiment involves measuring downlink delay difference for a cell/carrier for such a sector. One example mode of the fourth embodiment is illustrated in FIG. 15. For each sector, the radio base station 28 includes a sector transmit signal processing section 140, which pertains to a cell/carrier and which connects to the two diversity transmit antennas 144A and 144B for the sector.

In similar fashion to the sector receive signal processing section, the sector transmit signal processing section 140 processes two branches of a radio link signal to be transmitted, and accordingly has two branches 147A, 147B of signal processing hardware. The two branches 147A, 147B of signal processing hardware respectively process the two branches of the radio link signal received from on lines 157A and 157B, respectively from a transmitter receiver board 160, also know as a TX board or TX. Each branch 147 of hardware has an associated delay adjustment means (such as delay adjustment buffer 155, shown as being located in the transit board 160, which is where the RF and BB signals get converted to one another.

In addition, sector transmit signal processing section 140 includes or interconnects to a processor, which can be (for example), the main processor 70 of the radio base station previously described. One function performed by such processor which is germane to an embodiment of the present invention is delay alignment, as depicted by closed loop downlink diversity branch delay alignment routine or unit 172. The main processor 70 and the board processor 164 communicate with one another as depicted by processor communication line 174.

In like manner with the receiver board 60 of previous embodiments, the transmit board 160 can either be dedicated to a single sector, or comprise a pool of boards wherein the 160 can be dedicated to a single cell/carrier or to a single sector, or shared among plural cell/carriers and/or sectors served by the radio base station.

FIG. 15 also shows that the user equipment unit (UE) 30T for the fourth embodiment includes a transceiver 260 and a processor 270. The processor 270 includes a rake receiver 262, which functions in similar manner as the rake receiver 62 previously described but with respect to diverse radio link signals received from differing diversity antenna 44 of the same cell/carrier of the same sector of the radio base station 28. In other words, the rake receiver 262 of the test user equipment unit (UE) 30T measures a delay difference between downlink radio signals of the cell/carrier received from antennas 44A and 44B (see, e.g., FIG. 10).

Figure 16:
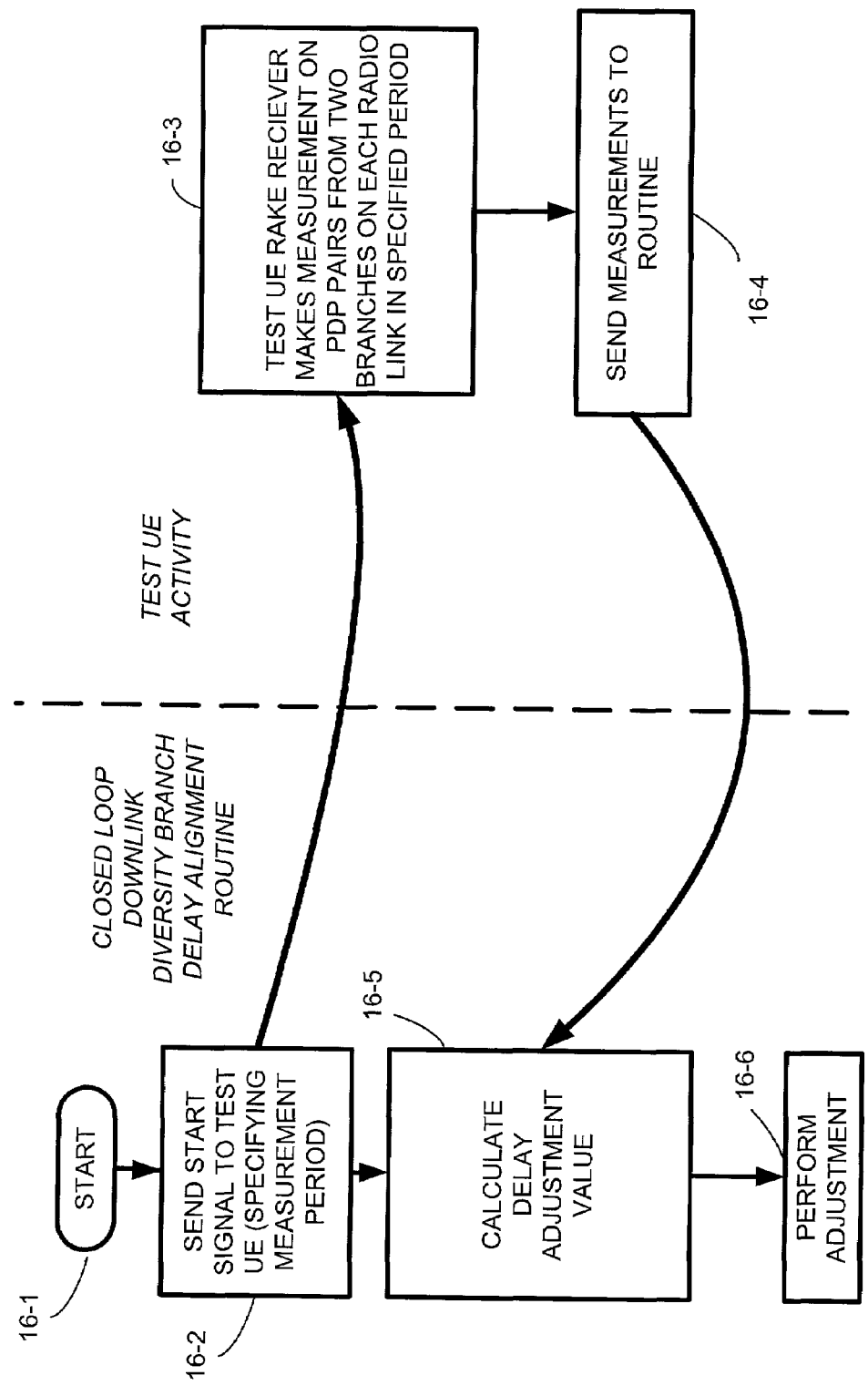
FIG. 16 is a flowchart showing certain basic steps and events performed in the fourth embodiment.

FIG. 16 illustrates certain basic example steps and actions performed in accordance with the fourth embodiment. These basic steps are understood in the example context of FIG. 15. Upon starting (depicted by symbol 16-1), the closed loop downlink diversity branch delay alignment routine or unit 172 as action 16-2 sends a start signal to the test user equipment unit (UE) 30T. The start signal of action 16-2 is transmitted as a special signal using the transmit capabilities of the radio base station, in similar manner as any other signal sent from the radio base station 28 to a user equipment unit (UE). In this regard, the test user equipment unit (UE) 30T can be configured uniquely to recognize this special start signal.

Upon receiving the start signal from the closed loop downlink diversity branch delay alignment routine or unit 172, the rake receiver 162 of the test user equipment unit (UE) 30T is authorized to make delay difference measurements on the PDP pairs from two diversity branches on each downlink radio link in the specified measurement period. Such measurements of the delay difference are performed as action 16-3 in FIG. 16. In actuality, in one implementation, plural measurements are performed with respect to each branch at a predetermined frequency, and the plural measurements are averaged over the measurement period. Upon expiration of the measurement period, using its transceiver 260 the test user equipment unit (UE) 30T as action 16-4 sends a report of the delay difference value to the closed loop downlink diversity branch delay alignment routine or unit 172 at the radio base station 28.

Upon receipt of the measurement report from the test user equipment unit (UE) 30T, as action 16-5 the closed loop downlink diversity branch delay alignment routine or unit 172 calculates a delay adjustment value for the sector downlink signal processing section 140. The calculated delay adjustment value is then applied to an appropriate one of the delay adjustment buffers 155.

It will be appreciated that the functions of various units and processors described herein can be implemented in various ways, including the functions of (for example) delay alignment unit 72, cell planning unit 74, main processor 70, board processor 64; angle of approach determination unit 64-12, processor 170, processor 270, and closed loop downlink diversity branch delay alignment routine or unit 172. For example, these functions may be implemented, either individually or collectively, using individual hardware circuits, using software functioning in conjunction with a suitably programmed digital microprocessor or general purpose computer, using an application specific integrated circuit (ASIC), and/or using one or more digital signal processors (DSPs).

As appropriate given the diversity considerations, the embodiments described above can be implemented in radio access networks of types other than the UTRAN. For example, other types of telecommunications systems which encompass radio access networks include the following: Advance Mobile Phone Service (AMPS) system; the Narrowband AMPS system (NAMPS); the Total Access Communications System (TACS); the Personal Digital Cellular (PDS) system; the United States Digital Cellular (USDC) system; and the code division multiple access (CDMA) system described in EIA/TIA IS-95

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

TABLE 1

```
For cell/carrier_ID = 1 to 6
    If (|TBranch_diff [cell/carrier_ID]| > TBranch_diff_Thresh)
    then
        If (TBranch_diff [cell/carrier_ID] >= 0)
        then
            TTRX_RF_UL[cell/carrier_ID,0] = TTRX_RF_UL[cell/
                carrier_ID,0] +
                TBranch_diff[cell/carrier_ID]
        Else If ( TBranch_diff [cell/carrier_ID] < 0)
        then
            TTRX_RE_UL[cell/carrier_ID,1] = TTRX_RF_UL[cell/
                carrier_ID,1]–
                TBranch_diff[cell/carrier_ID]
        Endif
        Send TTRX_RF_UL[cell/carrier_ID,0] and
        TTRX_RF_UL[cell/carrier_ID,1]
        down to HW
    Endif
Endfor
```

What is claimed is:

1. A method of operating a base station included in a radio access network of a telecommunications system, the method comprising:

(1) obtaining, respectively from two diversity antennas for a cell/carrier utilized in a sector served by the base station, two branches of an uplink radio link signal, the radio link signal being an unlink signal to the radio base station;

(2) routing the two branches of the radio link signal through two respective branches of signal processing hardware subsequent to receipt of the two branches of the unlink radio link signal from the respective two diversity antennas;

(3) using a rake receiver at the base station for measuring a delay difference between the two branches of the radio link signal;

(4) using the delay difference to determine a delay alignment adjustment value for compensating for the delay difference between the two branches of the radio link signal;

performing steps (1)–(3) with respect to radio link signals involved in plural calls with plural user equipment units;

after step (3), determining an average of the plural delay difference values with respect to the plural cells; and as step (4), using the average delay difference to determine the delay adjustment value.

2. The method of claim 1, further comprising:

utilizing plural rake receivers for measuring delay difference values between the two branches of the radio link signals, at least one of the plural rake receivers being utilized for plural cell/carriers;

for each of the plural rake receivers, storing, in a memory, the average of the plural delay difference values measured for a specified cell/carrier by the rake receivers;

periodically accessing the memory to obtain the average of the plural delay difference values for each of the plural rake receivers for the specified cell/carrier for calculating the delay alignment adjustment value for the specified cell/carrier.

3. The method of claim 2, further comprising:

for each of the plural rake receivers, storing for each of the plural cell/carriers, in a memory, an average of plural delay difference values measured by the rake receivers;

periodically accessing the memory to obtain the average of the plural delay difference values for each of the plural rake receivers on a per cell/carrier basis for calculating the delay alignment adjustment value for each of the plural cell/carriers.

4. The method of claim 1, further comprising applying the delay alignment adjustment value to one of the two branches of signal processing hardware to compensate for the delay difference.

5. The method of claim 4, further comprising applying the delay alignment adjustment value to a delay alignment buffer included in the one of the two branches of signal processing hardware to compensate for the delay difference.

6. A method of operating a base station included in a radio access network of a telecommunications system, the method comprising:

(1) obtaining, respectively from two diversity antennas for a cell/carrier utilized in a sector served by the base station, two branches of an uplink radio link signal;

(2) routing the two branches of the radio link signal through two respective branches of signal processing hardware subsequent to receipt of the two branches of the uplink radio link signal from the respective two diversity antennas;

(3) measuring a delay difference between the two branches of the radio link signal;

(A) performing steps (1)–(3) with respect to a radio link signal received from a test user equipment unit which is situated essentially equidistantly between the two diversity antennas, and thereby obtaining a hardware delay value;

(B) performing steps (1)–(3) with respect to a radio link signal received from a non-test user equipment unit which utilizes the cell/carrier in the sector, and thereby obtaining a total delay value;

(C) using the total delay value and the hardware delay value to determine an angle of arrival for the radio link signal received from a non-test user equipment unit.

7. The method of claim 6, wherein step (C) further comprises:

using the total delay value and the hardware delay value to determine a delay component attributable to the angle of arrival of the radio link signal from the non-test user equipment unit;

using the delay component attributable to the angle of arrival of the radio link signal from the non-test user equipment unit to determine an arrival delay component the arrival delay component being represented by a projection of a distance separating the two diversity antennas on a direction of approach of the radio link signal from the non-test user equipment unit;

using the arrival delay component to determine the angle of arrival.

8. The method of claim 6, further comprising:

performing step (B) and step (C) for plural non-test user equipment units which utilize the cell/carrier in the sector;

accumulating statistics pertaining to the angle of arrival of radio link signals received by the plural non-test user equipment units.

9. A base station included in a radio access network of a telecommunications system and comprising:

two diversity antennas for a cell/carrier utilized in a sector served by the base station from which are respectively obtained two branches of an uplink radio link signal transmitted between the base station and a user equipment unit;

two branches of signal processing hardware at the base station which respectively process the two branches of the uplink radio link signal either before or after transmission between the user equipment unit and the base station; and plural rake receivers which, with respect to radio link signals involved with plural calls with plural user equipment units, measure delay difference values between the two branches of the plural radio link signals, at least one of the plural rake receivers being utilized for plural cell/carriers;

a local memory for each of the plural rake receivers in which is stored an average of plural delay difference values measured for a specified cell/carrier by the rake receivers;

a processor which uses the delay difference to determine a delay alignment adjustment value, and wherein the processor periodically accesses the local memory to obtain the average of the plural delay difference values for each of the plural rake receivers for the specified cell/carrier for calculating the delay alignment adjustment value for the specified cell/carrier.

10. The apparatus of claim 9, wherein each rake receiver is situated on a board which has a board processor which computes the average of plural delay difference values measured for the specified cell/carrier; and wherein the processor which periodically accesses the local memory is a main processor which is distinct from the board processor.

11. The apparatus of claim 10, further comprising an array of rake receivers each having a board processor which is periodically accessed by the main processor.

12. The apparatus of claim 9, wherein the processor periodically accesses the local memories for the plural rake receivers to obtain the average of the plural delay difference values for each of the plural rake receivers on a per cell/carrier basis for calculating the delay alignment adjustment value for each of the plural cell/carriers.

13. The apparatus of claim 12, wherein each rake receiver is situated on a board which has a board processor which computes the average of plural delay difference values measured for the specified cell/carrier; and
wherein the processor which periodically accesses the local memory is a main processor which is distinct from the board processor.

14. The apparatus of claim 9, wherein the delay alignment adjustment value is applied to one of the two branches of signal processing hardware.

15. The apparatus of claim 14, wherein the delay alignment adjustment value is applied to a delay alignment buffer included in the one of the two branches of signal processing hardware.

16. A radio access network of a telecommunications system comprising:
a base station having two diversity antennas for a cell/carrier utilized in a sector served by the base station;
a test user equipment unit situated essentially equidistantly with respect to the two diversity antennas, two branches of an uplink radio link signal received from the test user equipment unit being obtained respectively from the two diversity branches;
the base station further comprising:
two branches of signal processing hardware which respectively process the two branches of the radio link signal;
a rake receiver which measures a delay difference between the two branches of the uplink radio link signal;
a local memory for the rake receiver in which is stored an average of plural delay difference values measured for the cell/carrier by the rake receiver;
a processor which uses the delay difference to determine a delay alignment adjustment value, and wherein the processor periodically accesses the local memory to obtain the average of the plural delay difference values for calculating the delay alignment adjustment value for the cell/carrier.

17. The apparatus of claim 16, wherein the rake receiver is situated on a board which has a board processor which computes the average of plural delay difference values measured for the cell/carrier; and
wherein the processor which periodically accesses the local memory is a main processor which is distinct from the board processor.

18. The apparatus of claim 16, wherein the delay alignment adjustment value is applied to one of the two branches of signal processing hardware.

19. The apparatus of claim 18, wherein the delay alignment adjustment value is applied to a delay alignment buffer included in the one of the two branches of signal processing hardware.

20. A radio access network of a telecommunications system comprising:
a base station having two diversity antennas for a cell/carrier utilized in a sector served by the base station;
a test user equipment unit situated essentially equidistantly with respect to the two diversity antennas, two branches of a radio link signal received from the test user equipment unit being obtained respectively from the two diversity branches;
the base station further comprising:
two branches of signal processing hardware which respectively process the two branches of the radio link signal;
means for measuring a delay difference between the two branches of the radio link signal;
a non-test user equipment unit which utilizes the cell/carrier in the sector, wherein the two branches of signal processing hardware respectively process the two branches of the radio link signal received from the non-test user equipment unit;
wherein the means for measuring measures a delay difference between the two branches of the radio link signal for the non-test user equipment unit to obtain a total delay value;
wherein the delay difference between the two branches of the radio link signal measured for the test user equipment unit is used as a hardware delay value; and further comprising
an angle of arrival determination unit which uses the total delay value and the hardware delay value to determine an angle of arrival for the radio link signal received from the non-test user equipment unit.

21. The apparatus of claim 20, wherein the angle of arrival determination unit executes the steps of:
(A) using the total delay value and the hardware delay value to determine a delay component attributable to the angle of arrival of the radio link signal from the non-test user equipment unit;
(B) using the delay component attributable to the angle of arrival of the radio link signal from the non-test user equipment unit to determine an arrival delay component, the arrival delay component being represented by a projection of a distance separating the two diversity antennas on a direction of approach of the radio link signal from the non-test user equipment unit;
(C) using the arrival delay component to determine the angle of arrival.

22. The apparatus of claim 21, wherein the angle of arrival determination unit performs step (B) and step (C) for plural non-test user equipment units which utilize the cell/carrier in the sector; and accumulates statistics pertaining to the angle of arrival of radio link signals received byte plural non-test user equipment units.

23. A radio access network of a telecommunications system comprising:
a base station having two diversity antennas for a cell/carrier utilized in a sector served by the base station;
a test user equipment unit situated essentially equidistantly with respect to the two diversity antennas, two branches of a radio link signal being transmitted between the test user equipment unit and the two diversity antennas;
the base station further comprising two branches of signal processing hardware which respectively process the two branches of the radio link signal; and
wherein the test user equipment unit measures a delay difference between the two branches of the radio link signal and transmits a report of the delay difference over an air interface to the base station.

24. The apparatus of claim 23, wherein the user equipment unit comprises a rake receiver which measures the delay difference between the two branches of the radio link signal.

25. The apparatus of claim 23, further comprising a processor at the base station which uses the delay difference to determine a delay alignment adjustment value.

26. The apparatus of claim 25, wherein the delay alignment adjustment value is applied to one of the two branches of signal processing hardware.

27. The apparatus of claim 26, wherein the delay alignment adjustment value is applied to a delay alignment buffer included in the one of the two branches of signal processing hardware.

28. The method of claim 23, further comprising using a rake receiver at the user equipment unit for measuring the delay difference between the two branches of the radio link signal.

29. The method of claim 23, further using the delay difference to determine a delay alignment adjustment value.

30. The method of claim 29, further comprising applying the delay alignment adjustment value to one of the two branches of signal processing hardware.

31. The method of claim 30, further comprising applying the delay alignment adjustment value to a delay alignment buffer included in the one of the two branches of signal processing hardware.

32. A method of operating a telecommunications system, the method comprising:

routing two branches of a radio link signal through corresponding two branches of signal processing hardware at a base station and applying the two branches of the radio link signal respectively to two diversity antennas at the base station;

transmitting the two branches of the radio link signal over an air interface from the two diversity antennas to a test user equipment unit, the test user equipment unit being situated essentially equidistantly with respect to the two diversity antennas;

at the user equipment unit, measuring a delay difference between the two branches of the radio link signal and transmitting a report of the delay difference over an air interface to the base station.

* * * * *